United States Patent

Nakamura et al.

[11] Patent Number: 5,982,563
[45] Date of Patent: Nov. 9, 1999

[54] PROJECTION-TYPE DISPLAY APPARATUS

[75] Inventors: Hiroki Nakamura, Chigasaki; Yoshihiro Watanabe, Yokohama, both of Japan

[73] Assignee: Kabushiki Kaisha Toshiba, Kawasaki, Japan

[21] Appl. No.: 09/031,822

[22] Filed: Feb. 27, 1998

Related U.S. Application Data

[63] Continuation of application No. 08/549,569, Oct. 27, 1995, Pat. No. 5,777,804.

[30] Foreign Application Priority Data

Oct. 28, 1994 [JP] Japan .................................. 6-264329

[51] Int. Cl.[6] .................................................. G02B 17/00
[52] U.S. Cl. ............................... 359/727; 353/98; 355/67
[58] Field of Search ............................... 359/727; 353/98, 353/38, 102; 355/53, 67

[56] References Cited

U.S. PATENT DOCUMENTS

| | | | |
|---|---|---|---|
| 4,780,747 | 10/1988 | Suzuki et al. | 355/68 |
| 5,161,042 | 11/1992 | Hamada | 359/41 |
| 5,300,942 | 4/1994 | Dolgoff | 345/32 |
| 5,374,968 | 12/1994 | Haven et al. | 353/31 |
| 5,455,694 | 10/1995 | Ariki et al. | 359/40 |
| 5,473,410 | 12/1995 | Nishi | 355/53 |
| 5,622,418 | 4/1997 | Daijogo et al. | 353/97 |

FOREIGN PATENT DOCUMENTS 1-189685  7/1989  Japan .

*Primary Examiner*—Georgia Epps
*Assistant Examiner*—Suzanne Letendre
*Attorney, Agent, or Firm*—Pillsbury Madison & Sutro, LLP

[57] ABSTRACT

A projection-type display apparatus including an elliptical condenser mirror having a concave reflecting surface consisting of part of a substantially elliptical surface, a light source arranged near a first focal point of the elliptical surface, a collimator lens having a focal point near a second focal point of the elliptical surface, and an optical modulation element array having a lens array on the collimator lens side, in which optical modulation elements each having an area S are two-dimensionally arranged.

4 Claims, 20 Drawing Sheets

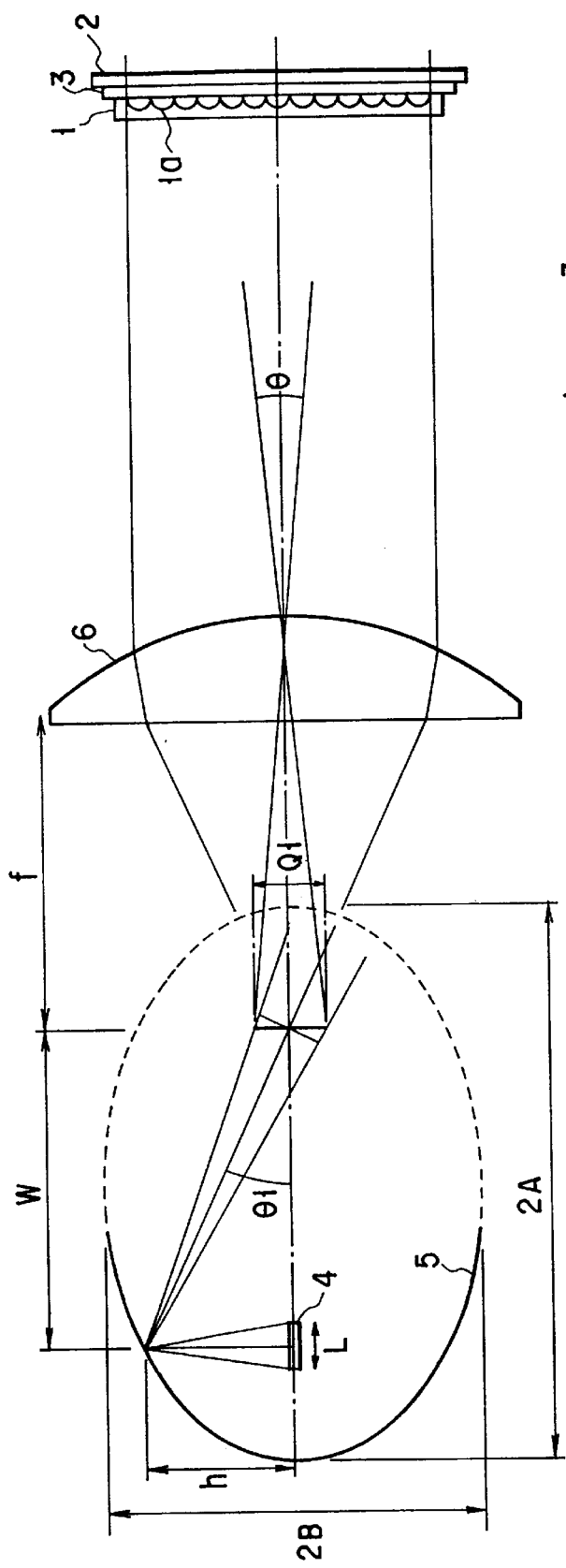
F I G. 3A
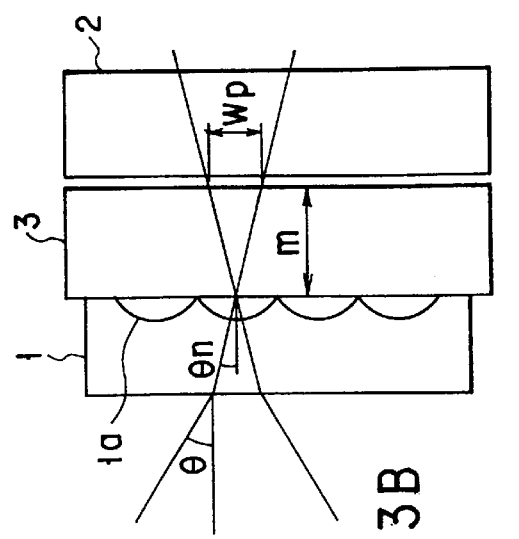
F I G. 3B
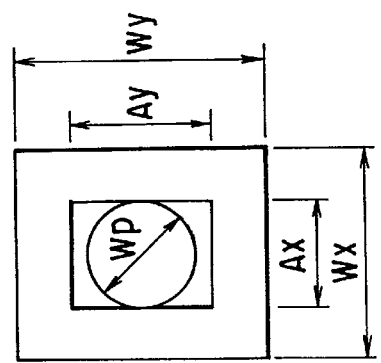
F I G. 3C

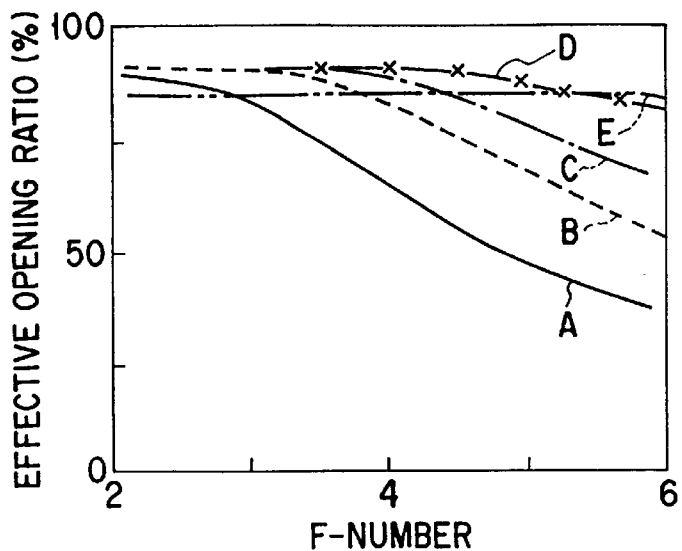
F I G. 23A
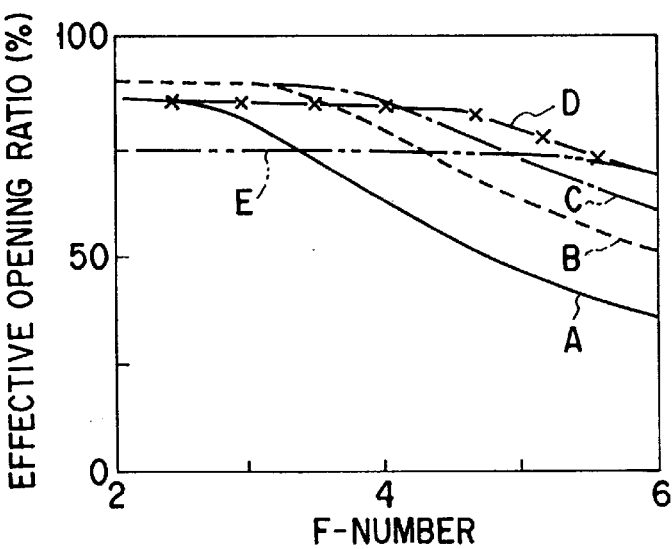
F I G. 23B
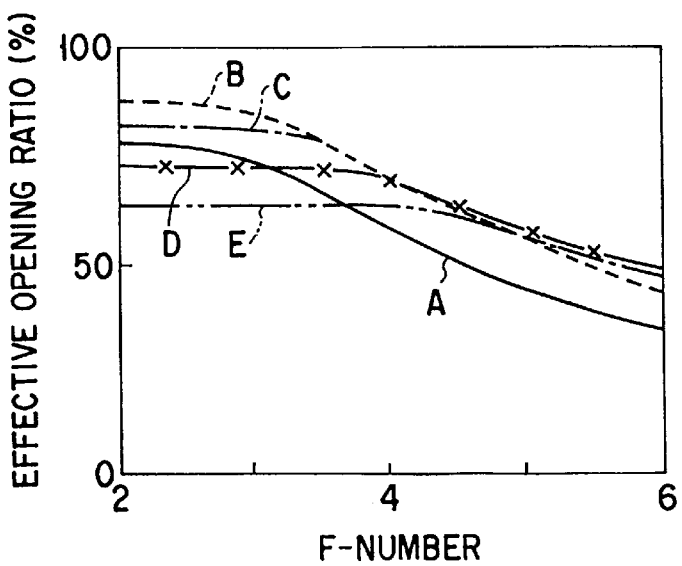
F I G. 23C

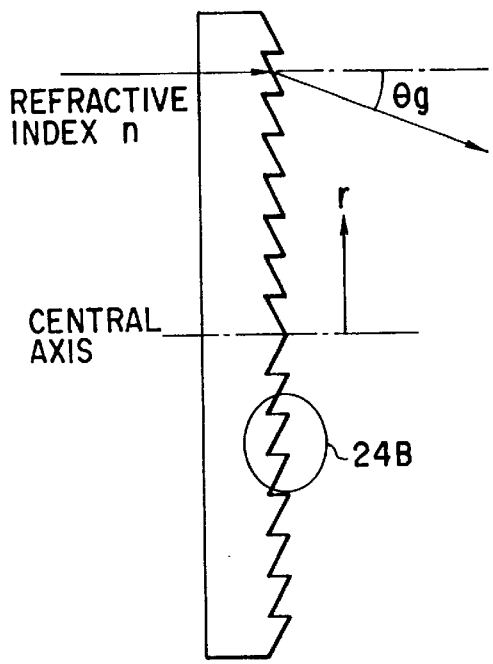
F I G. 24 A
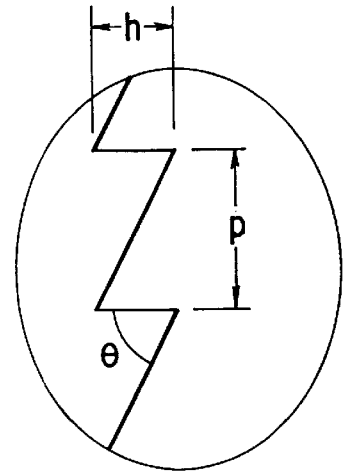
F I G. 24 B
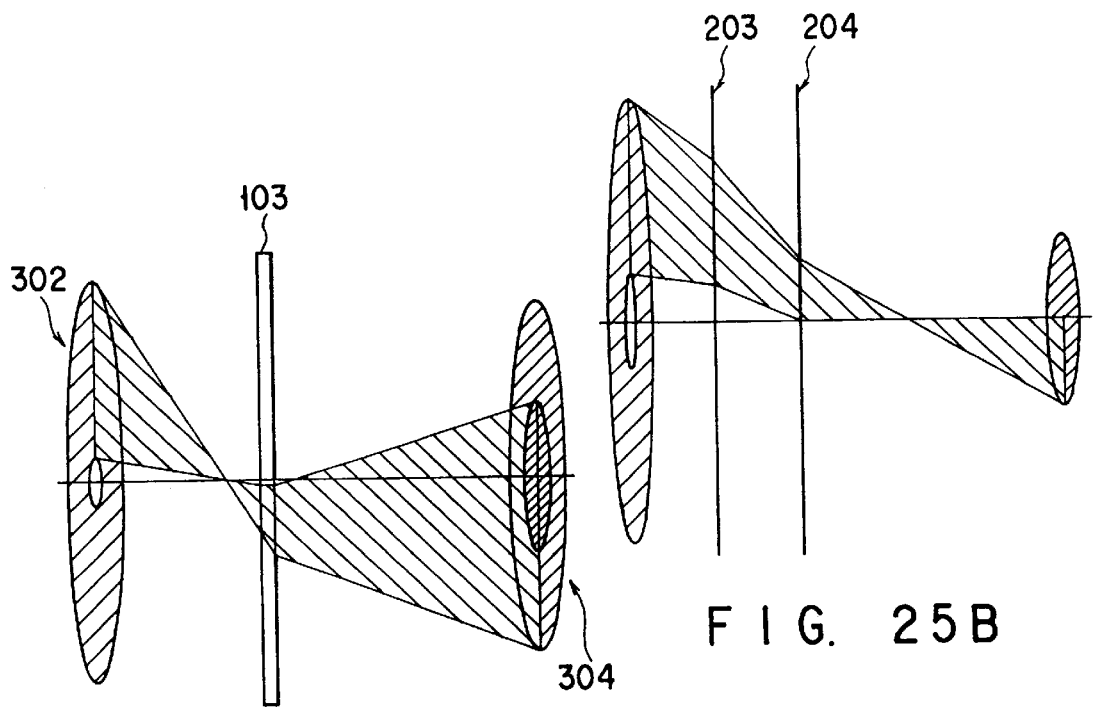
F I G. 25 A
F I G. 25 B

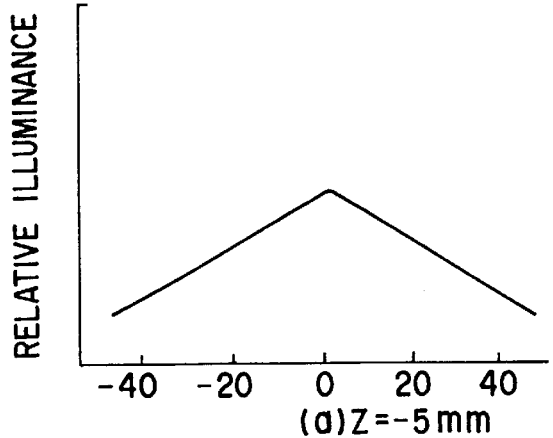
F I G. 26A
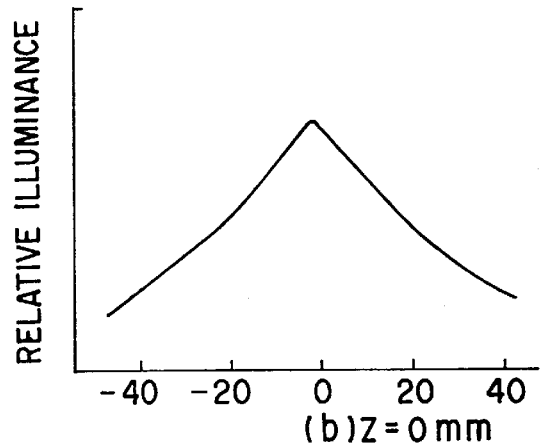
F I G. 26B
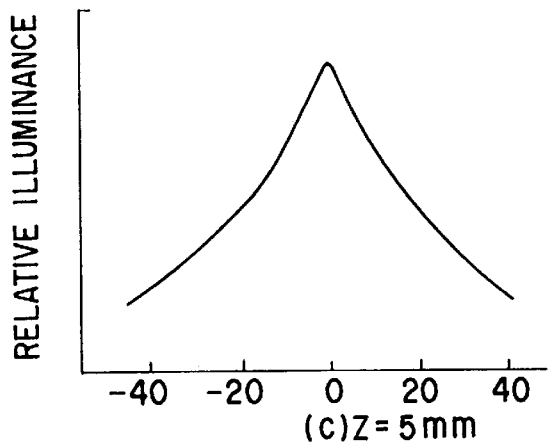
F I G. 26C
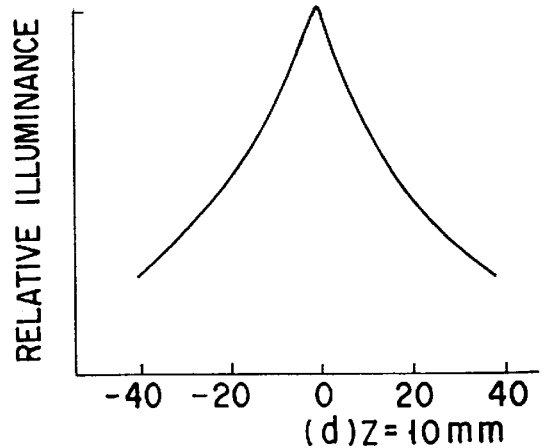
F I G. 26D

PROJECTION-TYPE DISPLAY APPARATUS

This is a continuation of application Ser. No. 08/549,569 filed Oct. 27, 1995, now U.S. Pat. No. 5,777,804.

BACKGROUND OF THE INVENTION

1. Field of the Invention

The present invention relates to a display apparatus for displaying an image on the basis of a video signal and, more particularly, to a projection-type display apparatus for displaying an image on a reflection- or transmission-type screen, and a light modulation element array for a projection-type display apparatus.

2. Description of the Related Art

Currently, plasma display panels or liquid crystal panels have received a great deal of attention as compact, light weight, flat panel display apparatuses replacing CRT display apparatuses. The flat panel display apparatuses can be classified into self-emission type apparatuses which emit light by itself in a display operation and transmittance control type apparatuses which control the transmittance of light incident from an independent light source in the display operation. A plasma display panel belongs to the self-emission type apparatuses while a liquid crystal panel belongs to the transmittance control type apparatuses. Particularly, a display apparatus of the transmittance control type represented by a liquid crystal panel is considered as a most promising next-generation display apparatus, and techniques for this apparatus have been developed in a variety of practical fields.

A general liquid crystal panel is characterized in that a light beam which is linearly polarized using a polarizing plate is caused to be incident on a liquid crystal layer exhibiting birefringence or rotatory polarization, as represented by a twisted nematic (TN) liquid crystal described in the liquid crystal device handbook.

As shown in FIG. 1, a projection-type display apparatus 901 using such a liquid crystal panel comprises liquid crystal panels 911-R, 911-G, and 911-B respectively corresponding to red (R), green (G), and blue (B), a light source optical system having a light source 921 for irradiating light on the liquid crystal panels 911-R, 911-G, and 911-B and a parabolic condenser mirror 931 for collimating source light from the light source 921, and a projection optical system having a projection lens 941 for projecting the light selectively transmitted from the liquid crystal panels 911-R, 911-G, and 911-G onto a screen.

It is important for the projection-type display apparatus to improve brightness. From this viewpoint, attempts have been made such that a microlens array is arranged in the liquid crystal panel to increase the effective aperture ratio, or a polymer-dispersed liquid crystal which needs no polarizing plate is used.

In the projection-type display apparatus 901, source light is collimated using the parabolic condenser mirror and caused to be incident on the liquid crystal panels. In this case, the electrode portion and the like of the light source form a shade. This makes the angle distribution of light incident on the liquid crystal panels large, and a parallel light component is lost, as shown in FIG. 2. For this reason, the effect for increasing the effective aperture ratio cannot be sufficiently achieved even by arranging microlenses on the light incident axis side of the liquid crystal panel.

SUMMARY OF THE INVENTION

It is an object of the present invention to provide a projection-type display-apparatus which achieves an improvement in brightness and a sufficient decrease in luminance irregularity in one display pixel surface and obtains a high-quality display image.

It is the other object of the present invention to provide a light modulation element array for such a projection-type display apparatus.

According to the present invention, there is provided a projection-type display apparatus comprising:

optical modulation means for controlling a light transmittance by mainly using birefringence or rotatory polarization of light;

a light source optical system for guiding source light from a light source to the optical modulation means; and a projection optical system for projecting the light modulated by the optical modulation means onto a screen, wherein the light source optical system has the light source and source light control means for controlling a converging angle of the source light from the light source, the source light control means including means for condensing the source light from the light source, stop means arranged near a position where the source light is condensed, and a collimator lens.

According to the present invention, there is also provided a projection-type display apparatus comprising:

an elliptical condenser mirror having a concave reflecting surface consisting of part of a substantially elliptical surface;

a light source arranged near a first focal point of the elliptical surface;

a collimator lens having a focal point near a second focal point of the elliptical surface;

an optical modulation element array having a lens array on the collimator lens side, in which optical modulation elements each having an area S are two-dimensionally arranged; and a projection lens, wherein the following relations are satisfied:

$$m \cdot Q_1 / (f \cdot n) < 2\sqrt{(S/\pi)}$$

$$Q_1 = L \cdot \frac{(2-\mu)^2}{2\mu\sqrt{(1-\mu)}}$$

(when the light source is arranged perpendicular to the elliptical condenser mirror)

$$Q_1' = L \cdot \frac{1+\sqrt{(1-\mu)}}{1-\sqrt{(1-\mu)}}$$

(when the light source is arranged parallel to the elliptical condenser mirror)

$$\mu = (B/A)^2 \quad (A: \text{major axis}, B: \text{minor axis})$$

where L is the length of a light-emitting portion of the light source, $\mu$ is the square of a ratio of the minor axis to the major axis of an ellipse of the elliptical condenser mirror, f is the focal length of the collimator lens, m is the distance between the lens array and an opening portion of the modulation element, and n is the refractive index between the lens array and the modulation element.

According to the present invention, there is also provided an optical modulation element array for a projection-type display apparatus, comprising:

an elliptical condenser mirror having a concave reflecting surface consisting of part of a substantially elliptical surface;

a light source arranged near a first focal point of the elliptical surface of the elliptical condenser mirror and having a light-emitting portion with a length L;

a collimator lens having a focal point near a second focal point of the elliptical surface and a focal length f, the optical modulation element array having a lens array on the collimator lens side, in which optical modulation elements are two-dimensionally arranged, and a projection lens;

wherein the following relations are satisfied:

$$m \cdot Q_1 / (f \cdot n) < 2\sqrt{(S/\pi)}$$

$$Q_1 = L \cdot \frac{(2-\mu)^2}{2\mu\sqrt{(1-\mu)}}$$

(when the light source is arranged perpendicular to the elliptical condenser mirror)

$$Q'_1 = L \cdot \frac{1 + \sqrt{(1-\mu)}}{1 - \sqrt{(1-\mu)}}$$

(when the light source is arranged parallel to the elliptical condenser mirror)

$\mu = (B/A)^2$ (A: major axis, B: minor axis)

where m is the distance between the lens array and an opening portion of the modulation element, n is the refractive index between the lens array and the modulation element, and S is the area of the modulation element.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 3A to 3C are views for explaining the light source optical system of a projection-type display apparatus of the present invention;

FIGS. 23A to 23C are graphs showing the dependency of the effective aperture ratio on the f-number;

FIGS. 24A and 24B are sectional views of a grating lens for correcting the beam direction;

FIGS. 25A and 25B are views for explaining the principle of the grating lens;

FIGS. 26A to 26D are graphs showing a change in illuminance distribution in accordance with a change in position of the grating lens.

DETAILED DESCRIPTION OF THE PREFERRED EMBODIMENTS

Figure 1:
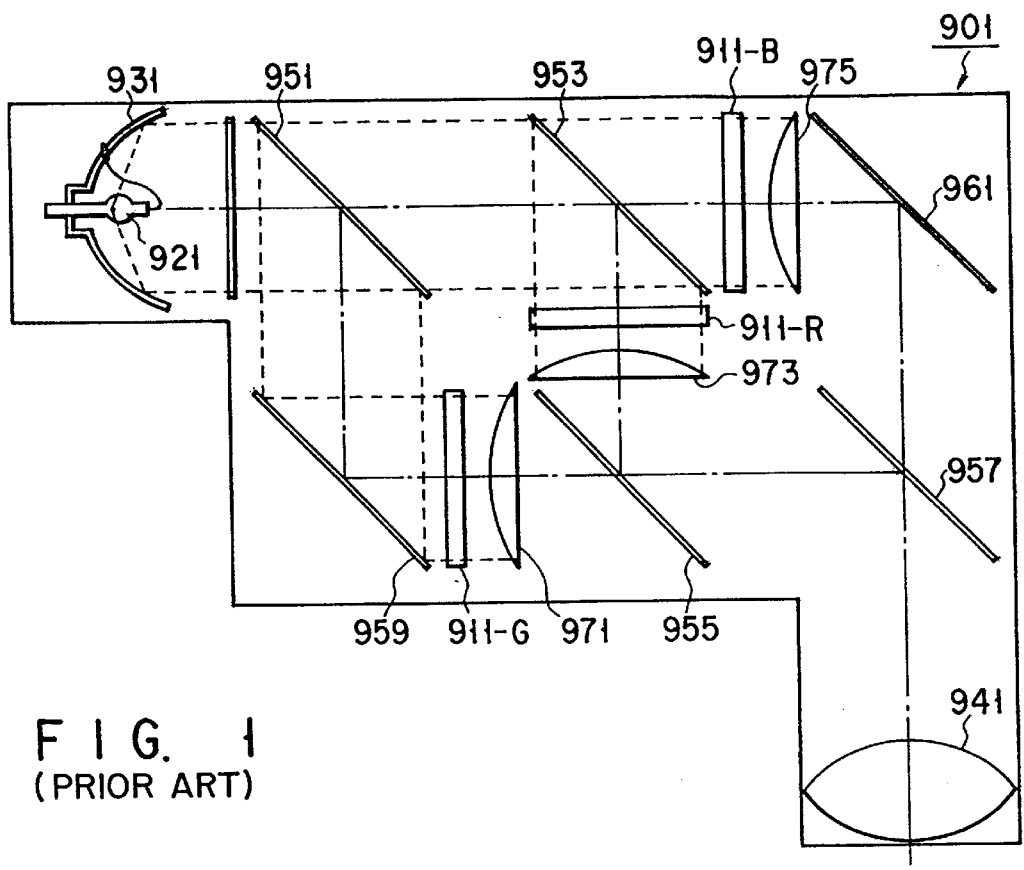
FIG. 1 is a view schematically showing a conventional three-panel projection-type display apparatus.

According to the conventional projection-type display apparatus, the parallel light component of a light beam incident on the liquid crystal panel is lost due to the following reason, and a light beam having a large converging angle is incident. More specifically, since a light source having a definite light-emitting length is arranged perpendicular to the parabolic condenser mirror, the extraction electrode and the like of the light source form a shade, and a perpendicular incident component with respect to the liquid crystal panel is lost. In addition, the light source used in the conventional projection-type display apparatus has a silica glass bulb surface subjected to diffusion processing called frost processing for the purpose of minimizing color and luminance irregularities, resulting in an increase in components having a large converging angle.

When such an incident optical system is used for a modulation element such as a liquid crystal panel which has no normal microlens and only optically modulates incident light, no serious problem is posed. However, when a microlens array is arranged on the incident side in the liquid crystal panel to decrease a loss in transmittance of the liquid crystal, which is caused by the light-shielding area, it is necessary to cause a more parallel light beam to be incident on the liquid crystal panel in order to increase the effective light transmittance.

In a projection-type display apparatus of the present invention, as shown in FIGS. 3A to 3C, a light-emitting length L of a light source 4, the shape parameters (major and minor axes) of an elliptical condenser mirror 5, and the focal length of a collimator lens 6 are optimized with respect to a distance m between a microlens array 1 and a modulation area defining area of an optical modulation element 2 having a source light converging means consisting of the microlens 1, a refractive index n of an optical medium 3 between the microlens array 1 and the modulation area defining area, and a modulation element area S. with this arrangement, the effect for increasing the effective aperture ratio by the microlens 1 can be enhanced.

Since the light source used in the projection-type display apparatus is not a point light source, it is important that the light beam has a predetermined angle distribution. According to the present invention, the light source 4 is arranged near the first focal point of the elliptical condenser mirror 5 to condense source light near the second focal point, thereby guiding an almost parallel light beam to the optical modulation element 2 through the collimator lens 6.

To achieve a high luminance which is an important factor for the projection-type display apparatus, the parallelism of incident light is increased in consideration of only the effective aperture ratio increase effect of the microlens 1. More specifically, e.g., a stop means is arranged near the second focal position of the elliptical condenser mirror 5, or the focal length of the collimator lens 6 is increased, thereby decreasing the converging angle. In this case, however, the total light beam incident on the optical modulation element 2 is degraded, so a high luminance cannot be immediately obtained.

Figure 2:
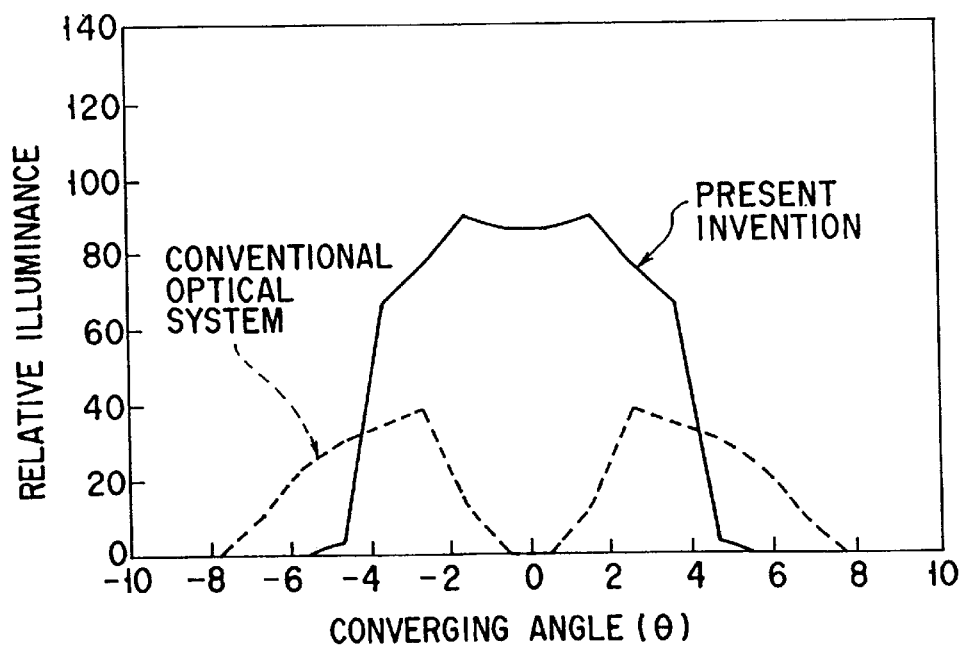
FIG. 2 is a graph showing the converging angle distribution of source light on a liquid crystal panel.

More specifically, the size parameters of the light source optical system must be optimized in accordance with the size parameters of the optical modulation element 2 having the microlens 1. In fact, on the liquid crystal panel surface with the optical arrangement of the present invention, a converging angle distribution of incident light as shown in FIG. 2 can be obtained. As compared to the prior art using the parabolic mirror and the frost-processed light source, the small converging angle components are not missing with a decrease in large converging angle components, and the effective aperture ratio increase effect by the microlens can be increased without degrading the luminous flux.

The optical system and optical modulation element of the present invention will be summarized below.

An ellipse has two focal points. The elliptical condenser mirror 5 with this shape has a function of condensing light from the light source 4 located at the first focal position to the second focal position.

When the light source 4 which is not frost-processed is arranged near the first focal point of the elliptical mirror 5 to form the image of the light source near the second focal point, the size of the image can be considered as follows. A light source which is not frost-processed is preferably used to avoid an extension of a light-emitting point.

More specifically, when the light source is arranged at the first focal point of the elliptical mirror 5, as shown in FIG. 3A, the diameter of the source image formed at the second focal position of the ellipse, is considered. The longitudinal direction of the arc or filament of the light source is assumed to be parallel to the optical axis of the ellipse.

As shown in FIG. 3A, the major and minor axes of the elliptical mirror 5 are given as 2A and 2B, respectively, the equation of an ellipse is represented by equation (1):

$$x^2/A^2 + y^2/B^2 = 1 \tag{1}$$

A direction perpendicular to the optical axis of the ellipse, where the intensity of light irradiated from the light source 4 onto the elliptical mirror 5 is maximized, will be considered. A distance h from the focal point where the light source 4 is located to the position where a perpendicular light beam is irradiated on the elliptical mirror 5 is represented by equation $$h = B^2/A \tag{2}$$

A distance W between the focal points is represented by equation (3):

$$W = 2\sqrt{(A^2 - B^2)} \tag{3}$$

The image reflected by the mirror 5 is considered to become large in proportion to the distance. Therefore, the length L of the light source 4 is increased as follows:

$$L \cdot \sqrt{(h^2 + W^2)} \Big/ h \tag{4}$$

At this time, as shown in FIG. 3A, a diameter $Q_1$ in a direction perpendicular to the optical axis is $1/\cos\theta_1$ times an irradiation angle $\theta_1$ because the light beam is obliquely incident on the second focal position.

From the above consideration, the diameter $Q_1$ of the image formed at the second focal position of the ellipse of the elliptical mirror 5 is represented by equation (5):

$$Q1 = L \cdot \sqrt{(h^2 + W^2)} \Big/ h \cdot \sqrt{(h^2 + W^2)} \Big/ W \tag{5}$$

$$= L \cdot (h^2 + W^2)/hW$$

$$= L \cdot (2 - \mu)^2 / 2\mu\sqrt{(1 - \mu)}$$

where $\mu = (B/A)^2$.

Figure 4:
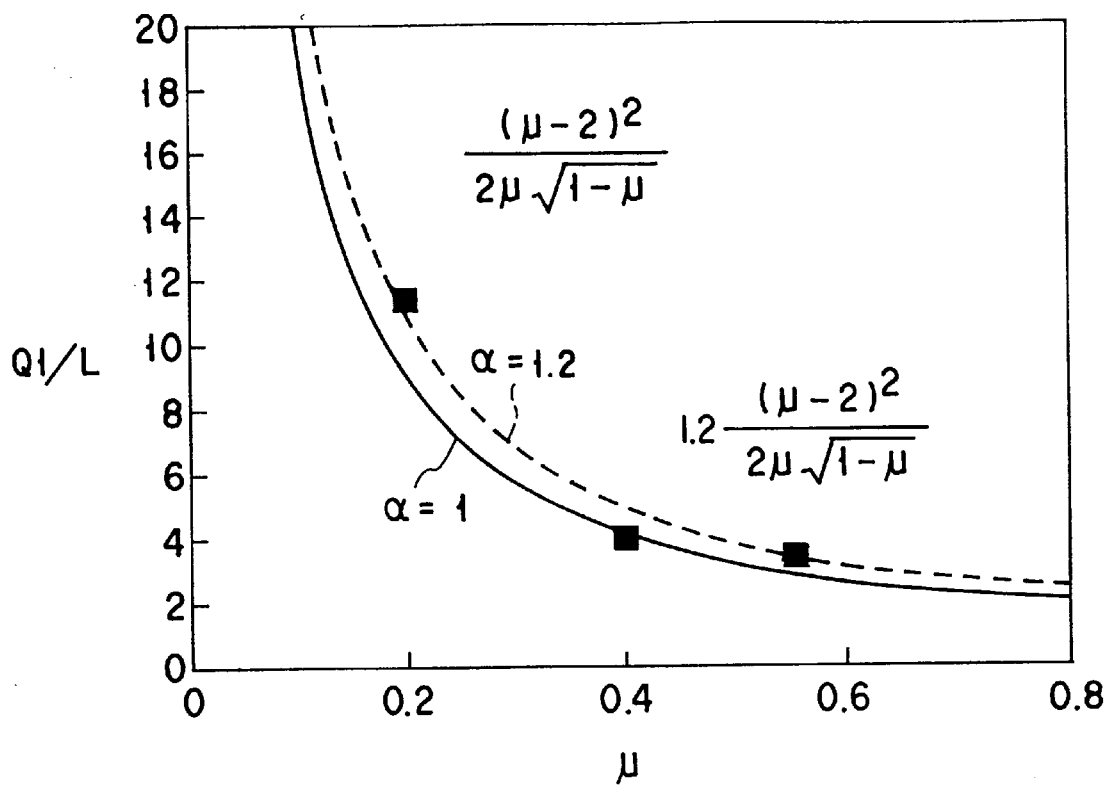
FIG. 4 is a graph showing the relationship between the ellipticity of an elliptic condenser mirror and $Q_1/L$ in the light source optical system of the projection-type display apparatus of the present invention.

This relation is obtained while largely simplifying the light-emitting characteristics of the light source 4 and represented as shown in FIG. 4 when experiments were conducted using some light sources and mirrors. In FIG. 4, $\mu=(B/A)^2$ is plotted along the abscissa, and a ratio ($Q_1/L$) of the source image diameter to the interelectrode distance is plotted along the ordinate.

When a coefficient $\alpha$ is used as in equation (6), a slight deviation from equation (5) at $\alpha=1$ is generated. This can be considered because the actual light emitted from the light source has a width in the direction perpendicular to the arc. From this experimental result, the diameter $Q_1$ of the actual image is represented by equation (6), and the value $\alpha$ is about 1 to 1.2:

$$Q_1 = \alpha L \cdot (2-\mu)^2 / 2\mu\sqrt{(1-\mu)} \qquad (6)$$

When the light source is arranged with its longitudinal direction being set parallel to the elliptical mirror, the diameter $Q_1$ of the actual image is represented by equation (7):

$$Q'_1 = L \cdot \left(1+\sqrt{1-\mu}\right) / \left(1-\sqrt{1-\mu}\right) \qquad (7)$$

An optical element can be effectively inserted in the position of the light source image $Q_1$ to control the direction of the light beam diverging from the source image, increase the focal length of the collimator lens, or decrease a display irregularity. As such an optical element for correcting the beam direction, a convex or concave conical lens, or one or a plurality of grating lenses can be inserted.

When the position of the optical element is controlled, the illuminance irregularity in light incident on the modulation element array can be controlled, and the luminance irregularity in projection can also be controlled. The optical element for correcting the beam direction can be effectively used also to decrease the illuminance irregularity on the liquid crystal panel surface, which is caused by the influence of the light source electrode portion and the like when the light source is arranged perpendicular to the elliptical condenser mirror.

In this case, the size of the source image viewed from the collimator lens side equivalently increases/decreases in accordance with the characteristics of the optical element because of conservation of the geometric optical amount. More specifically, because of conservation of a geometric extent in source image, when a maximum extent angle $\theta_{max1}$ of the angle of the light beam emerging from the source image is converted to $\theta_{max2}$ by the optical element, the apparent light-emitting area increases in accordance with a change in angle.

Figure 5:
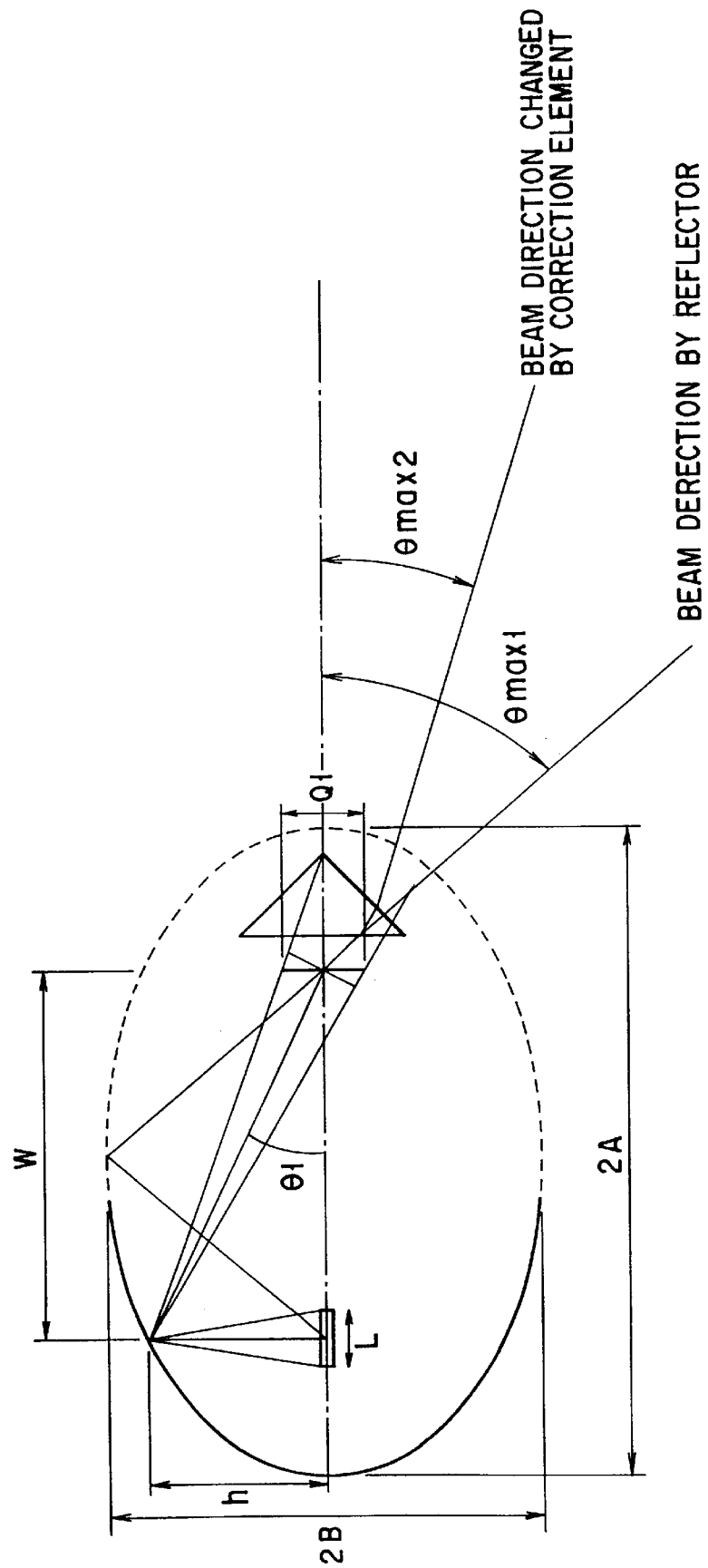
FIG. 5 is a view for explaining the light source optical system of the projection-type display apparatus of the present invention, which has an optical element for correcting the beam direction.

More specifically, as shown in FIG. 5, a divergence angle $\theta_2$ of light emerging from the optical element is represented by equation (8):

$$Q_2 = Q_1 \cdot \tan\theta_{max1}/\tan\theta_{max2} \qquad (8)$$

where $\theta_{max1}$ is the divergence angle of light from the source image in absence of an optical element, $\theta_{max2}$ is the divergence angle of light emerging from the optical element, $\theta_1$ is the divergence angle of light from the source image, and $\Delta\theta$ is the angle of correction of the beam direction by the optical element.

The light beam can be substantially collimated by arranging the collimator lens with respect to the divergent light from the source image. More specifically, as shown in FIG. 3A, when the lens 6 having a focal point near the source image viewed from the display panel side is arranged, a parallel light beam can be irradiated on the display panel. Although this light beam is a parallel beam, it has an angle distribution corresponding to the size of the source image, as a matter of course. This angle distribution is represented by equation (9) from a size Q of the source image, and a focal length f of the collimator lens 6:

$$\theta = \tan^{-1}(Q/2f) \qquad (9)$$

When a lens array 1a is arranged on the light incident side of the optical modulation element array such as a TN liquid crystal panel or the like, a source image is formed by the respective microlenses in the lens array 1a. When the light intensity transmitted through the optical modulation element 2 is to be considered, the light intensity distribution on the plane where the modulation element 2 is arranged is particularly important. More specifically, in a normal TN liquid crystal panel, the plane where the modulation element 2 is arranged is present between two glass substrates. The light transmission area on this plane is particularly important.

As shown in FIG. 3B, the light distribution on this plane with respect to an angle $\theta$ of incident light is represented by equation (10):

$$W_p = 2m \cdot \tan\theta_n \qquad (10)$$

where $\theta_n$ is the angle distribution obtained when the angle distribution $\theta$ of the incident light beam is refracted with the refractive index n of the optical medium 3 between the lens array 1a and the modulation element 2, and is represented by equation (11):

$$\theta_n = \sin^{-1}(\sin\theta/n) \qquad (11)$$

The relationship between light transmitted through the microlens and one modulation element in the modulation element array will be considered. One modulation element will be referred to as a pixel hereinafter. As shown in FIG. 3C, in a pixel in the modulation element array such as a liquid crystal panel, a width for transmitting light is preferably smaller than that of the pixel and more preferably smaller than that of an opening portion. More specifically, an area capable of transmitting light is preferably made smaller than a surface integral ratio per pixel. When the intensity of light incident on this area for transmitting light is increased as compared to an area for shielding light, the transmitting light intensity can be increased. For this purpose, a width $W_p$ in equation (10) must be smaller than a pitch P between pixels:

$$W_p < P \qquad (12)$$

Figure 6:
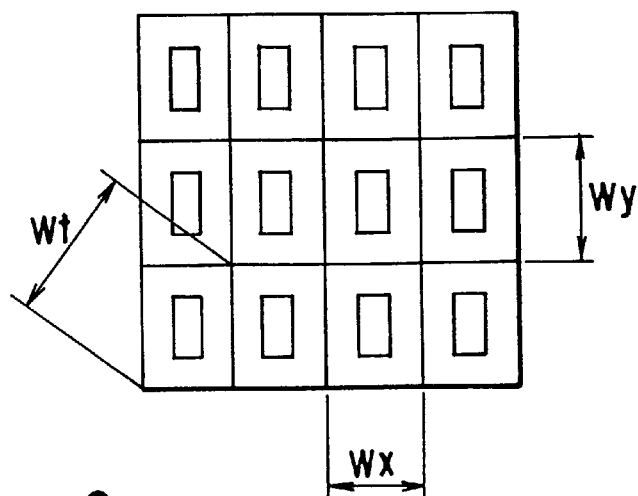
FIG. 6 is a view showing a pixel structure and a stripe arrangement in the projection-type display apparatus of the present invention.

This condition will be considered in more detail. As for the width $W_p$, the arrangement pitch changes depending on the arrangement method or direction of pixels. For example, a matrix arrangement (stripe arrangement) typical for a liquid crystal panel, as shown in FIG. 6, will be considered. The pitch in the longitudinal direction is $W_y$, the pitch in the transverse direction is $W_x$, and the width in the diagonal direction is $W_r$. When the angle distribution of light incident on the pixels is uniform and symmetrical with respect to the optical axis of the microlenses, circular light is incident on the incident surfaces of the pixels.

To increase the illuminance of the incident light in this circle as compared to a uniform illuminance distribution obtained using no microlens, the area of the circle must be smaller than the area of one pixel, as represented by inequality (13):

$$\pi(W_p/2)^2 < W_x \cdot W_y \qquad (13)$$

Similarly, when the pixels have another arrangement, or the angle distribution of incident light becomes asymmetrical and non-uniform, relation (14) must be satisfied:

$$S_{angle} \leq S_{pixel} \quad (14)$$

where $S_{angle}$ is the area formed by the angle distribution, and $S_{pixel}$ is the area of one pixel.

Whether it is preferable that the area $S_{angle}$ be as small as possible will be considered. A small area $S_{angle}$ is equivalent to a small angle distribution width θ of incident light, or a small interval m between the microlens and the pixel. However, to decrease θ, the size of light-emitting portion of the light source must be reduced, or the aberration of the collimator lens must be suppressed. However, a light source having a small light-emitting portion generally tends to degrade its luminous efficiency or service life. A small light-emitting portion may result in a degradation in characteristics.

As for the aberration of the collimator lens, a lens having a low aberration generally undesirably increases the cost. As for the interval between the microlens and the pixel as well, to decrease this interval, the NA of the microlens must be decreased. This increases the angle of light emerging from the pixel, resulting in a degradation in design efficiency of the projection optical system. From these viewpoints, $S_{angle}$ is preferably large.

Consider $S_{angle}$ and an area $S_A$ of the opening portion of the pixel. When $S_{angle}$ becomes smaller than $S_A$, and all light incident on the modulation element can be condensed and transmitted through the opening portion, $S_{angle}$ need not be decreased any more.

In fact, the shape of the opening portion does not necessarily match that of an image formed on the pixel by incident light. For this reason, to cause all light beams to be incident on the opening portion, the width $W_p$ of the image must be smaller than a minimum width $W_{min}$ of the opening portion. More specifically, assume that light is uniformly incident with a predetermined angle distribution θ with respect to the optical axis to obtain a circular incident light distribution having the diameter $W_p$ on the pixel, and the opening portion is rectangular, as shown in FIG. 6. In this case, all light beams can be transmitted when the incident light distribution completely overlaps the position of the opening portion, and a short side $A_x$ of the opening portion is equal to the diameter $W_p$, as shown in equation (15):

$$W_p = A_x \quad (15)$$

Even when $W_p$ is further reduced, no more light beam can be transmitted, and the above disadvantages increase.

In fact, $W_p$ may need to be made somewhat smaller than $A_x$ in consideration of an alignment margin between the incident light distribution and the opening portion. Therefore, the minimum value of $W_p$ must be set slightly smaller than $A_x$.

For an actual alignment margin, an alignment accuracy in assembly of the liquid crystal panel can be referred to. In a liquid crystal panel, the alignment accuracy is ±2 to ±5 μm. When microlenses are formed on the liquid crystal panel at the same accuracy, an error of ±4 to ±10 μm is generated. That is, an alignment margin of 8 to 20 μm is required. In consideration of this margin, $W_p$ must be $A_x$–(8 to 20) (μm).

More specifically, when a rectangular opening portion is to be formed in a rectangular pixel as shown in FIG. 6, relation (16) is established if the length of a short opening side is $A_m$:

$$A_m - (8 \text{ to } 20)\mu m \leq W_p \quad (16)$$

and $$\pi(W_p/2)^2 < W_x \cdot W_y$$

$$(\text{for } W_p < 2\sqrt{(S/\pi)}, S = W_x \cdot W_y)$$

Since $W_p = mQ/(f \cdot n)$, parameters including a major axis A and a minor axis B of the elliptical condenser mirror, the light-emitting length L of the light source, the focal length f of the collimator lens, the refractive index n between the microlens and the pixel, and the distance m between the microlens and the pixel are set such that $W_p$ is made smaller than the diameter of a circle having the same size as that of the pixel, i.e., $$2\sqrt{(S/\pi)}.$$

With this arrangement, the efficiency can be increased.

Figure 7:
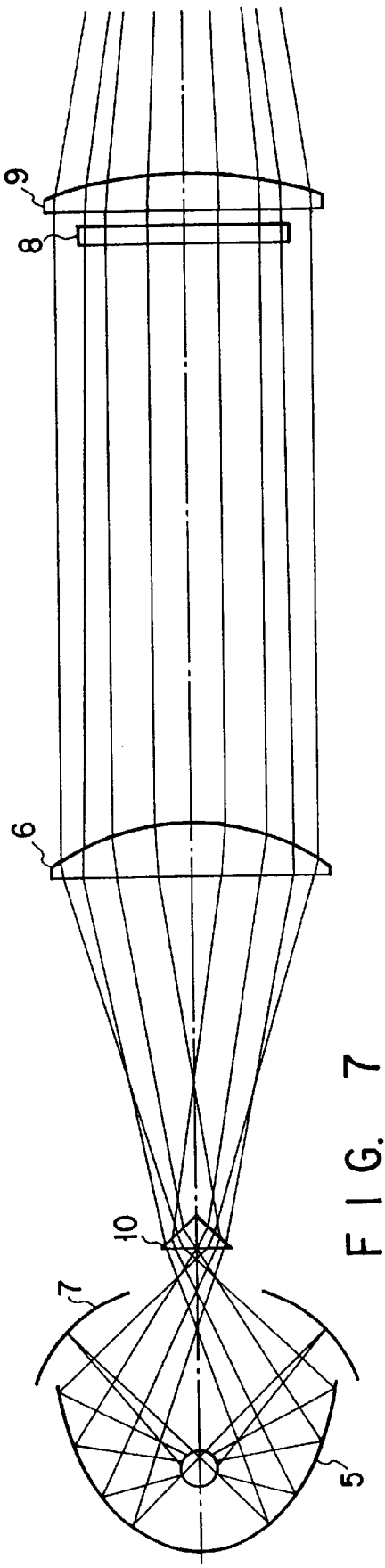
FIG. 7 is a view showing the light source optical system of the projection-type display apparatus of the present invention, in which a spherical condenser mirror is added to the elliptical condenser mirror.

Additionally, as shown in FIG. 7, from a viewpoint of effectively utilizing an optical component which is not reflected by the elliptical condenser mirror 5 and not condensed to the second focal position, a circular condenser mirror 7 is arranged to oppose the elliptical condenser mirror 5. When light reflected by the condenser mirror 7 is returned to the center of the light source, the source light can be further effectively utilized.

This arrangement using the circular condenser mirror 7 is particularly effective when the inter-electrode direction of the light source is set along the horizontal direction with respect to the elliptical condenser mirror 5 to minimize an illuminance irregularity on a liquid crystal panel 8 or decrease the effective light-emitting length, and light emitted from the light source 4 to the liquid crystal panel side cannot be effectively utilized.

Even when the light source electrode is arranged perpendicular to the elliptical condenser mirror 5, the above arrangement is effective to achieve a high luminance, as a matter of course. As in the present invention, in an arrangement wherein source light is condensed to the second focal point by the elliptical condenser mirror 5, the opening portion of the opposing condenser mirror 7 can be made small. For this reason, the efficiency can be largely improved. In FIG. 7, reference numeral 9 denotes a field lens, and reference numeral 10 denotes a conical lens.

When a light source having a long interelectrode distance in the light source 4, or the frost-processed light source 4 is used, the angle distribution of the converging angle of light incident on the liquid crystal panel extends. In this case, as in the display apparatus shown in FIG. 9 (to be described later), a stop control means 12 can be arranged near the second focal point of the elliptical condenser mirror 5 to remove a large converging angle component, thereby improving the parallelism. With this arrangement, the effective aperture ratio of the microlens can be sufficiently improved.

When the stop control means is arranged near the second focal point, the converging angle distribution of light incident on the liquid crystal panel can be freely controlled, and at the same time, illuminance irregularity in light incident on the liquid crystal panel can also be controlled. When the stop diameter is reduced, the converging angle can be decreased, and the illuminance irregularity in light incident on the liquid crystal panel can also be minimized. However, although the effect resulting from the decrease in effective aperture ratio of the microlens can be enhanced by reducing the stop diameter, the screen illuminance in projection is degraded because of a decrease in total light beam.

For this reason, the stop diameter can be controlled in accordance with the illumination environment where the projection-type display apparatus is used. For example, in use in a dark room, the stop diameter is reduced such that the illuminance irregularity is minimized rather than increasing the projection illuminance. In a bright room, the stop diameter is increased to increase the projection illuminance rather than suppressing the illuminance irregularity.

In addition, the stop control means may be controlled in accordance with not only the room brightness but also a video luminance signal, as a matter of course. When a plurality of rear projection-type display apparatuses are arranged to achieve a large screen, the stop diameter must be controlled to be small such that the illuminance irregularity is minimized, because a large decrease in illuminance in the ambient of the projection-type display apparatuses poses a problem.

However, when the parallelism of a source light is improved to realize a bright projection-type apparatus, the total light beam is reduced in fact. Therefore, a light beam having an optimum parallelism must be caused to be incident on the display panel by using a synergetic effect of the total light beam of the source light beam and the improvement effect for the microlens. When an average diameter D (m) in use of the stop means is also set to satisfy relation (17), brightness improvement by the microlens can be optimized:

$$m \cdot D / (f \cdot n) < 2\sqrt{(S/\pi)} \qquad (17)$$

where L (m) is the distance between the node of the collimator lens 6 constituting the source light control means and the center of the stop, S (m$^2$) is the area of the pixel, m (m) is the distance between the node of the microlens and the opening of the pixel, and n is the refractive index of the medium between the microlens and the opening.

Figure 8:
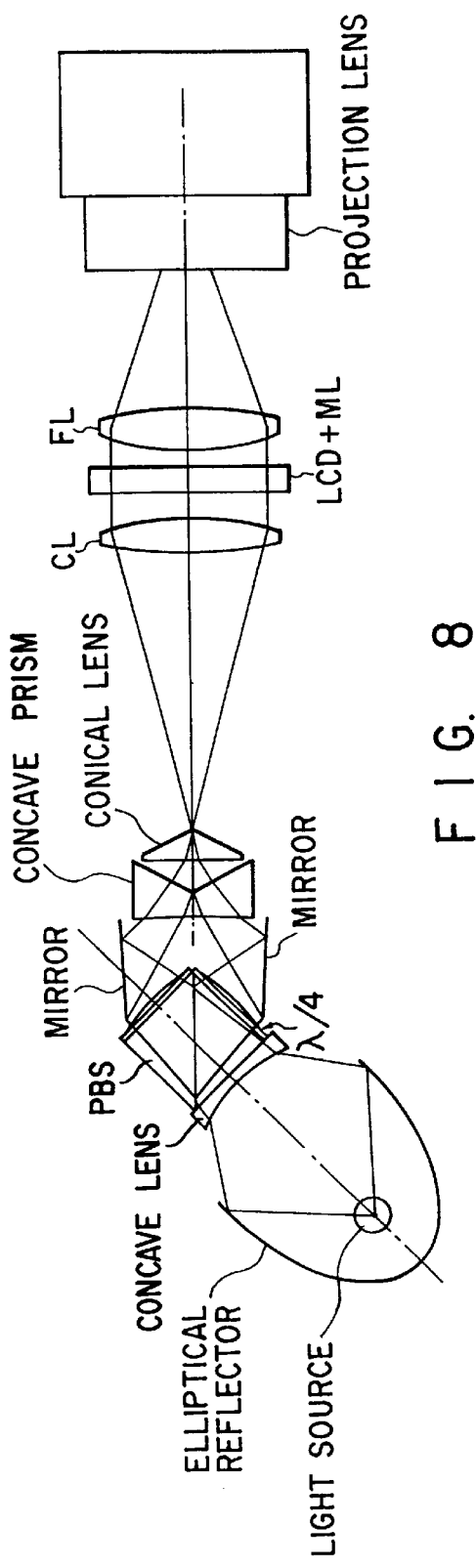
FIG. 8 is a view showing an optical system of the projection-type display apparatus of the present invention, to which a polarizing/converting optical system is added.

As shown in FIG. 8, when a means for branching light emitted from the light source into two polarized light beams, i.e., a P-polarized light beam and an S-polarized light beam, which are perpendicular to each other, a means for causing the plane of polarization of one of the two polarized light beams to match the plane of polarization of the other, and a means for condensing the light beams to the stop means are arranged between the light source and the stop means, the intensity of light incident on the display panel can be increased, thereby achieving a bright projection-type display apparatus.

A normal polarization/conversion optical system in which a polarization/conversion element is only arranged between the light source and the display panel cannot be applied to a display panel having microlenses because the angle distribution of light incident on the display panel is not uniform. However, this problem can be solved with the above arrangement. In addition, luminance irregularity control can be performed by the stop means or the optical element for correcting the beam direction.

Figure 9:
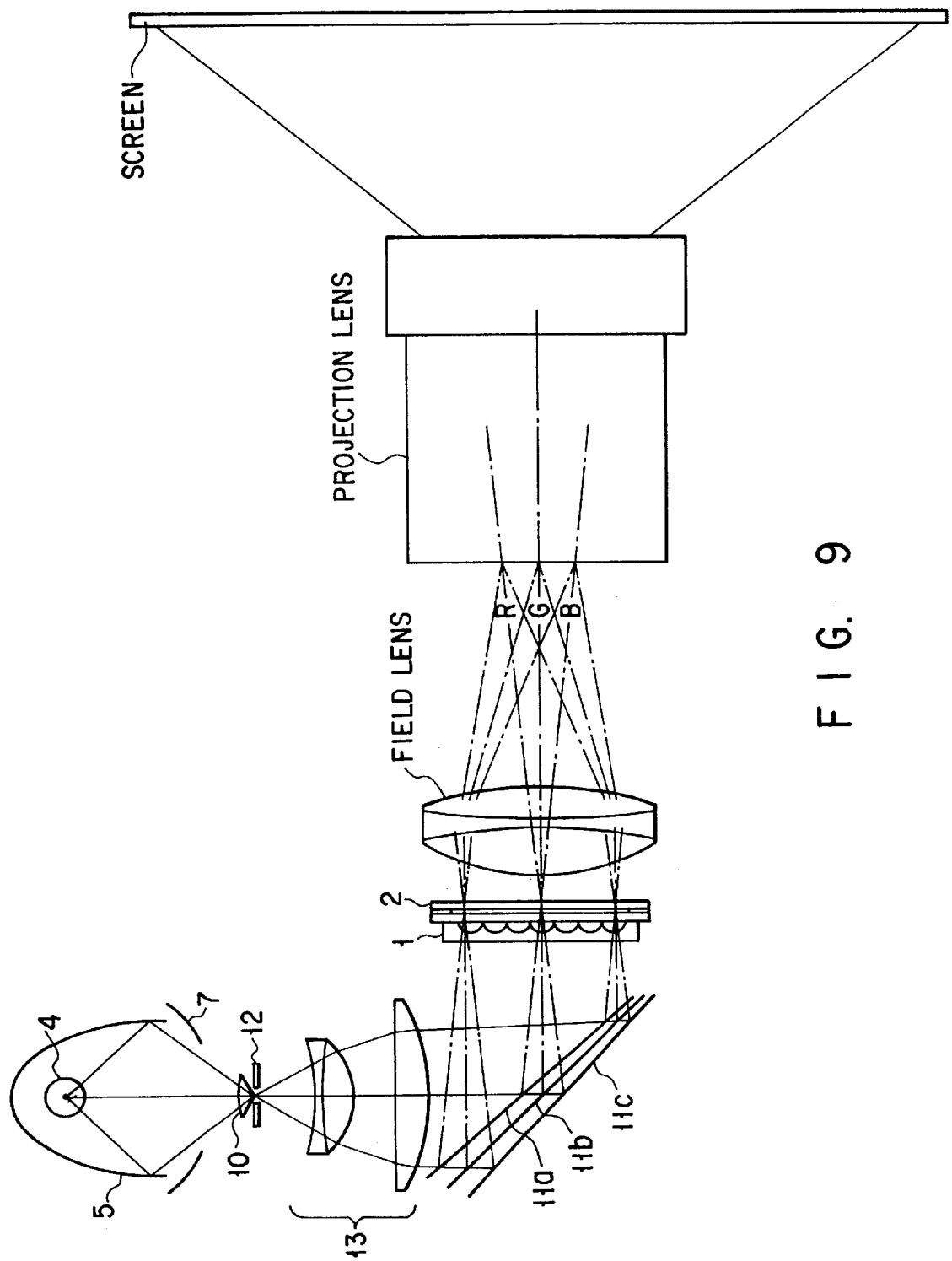
FIG. 9 is a view showing an optical system of the projection-type display apparatus of the present invention, to which a spectral component direction separating means and a spectral component coupling means are added.

As shown in FIG. 9, when a color separation means, a means for causing each color light beam to be incident on the corresponding display panel at a desired angle, and a means for forming each color light beam into an image on the corresponding color pixel are provided to the light source optical system, a color image can be projected using a single display panel having no color filter. For this reason, the light-resistance of a color filter poses no problem. In addition, since an optical loss by a color filter is not present, the brightness can be increased.

Figure 10:
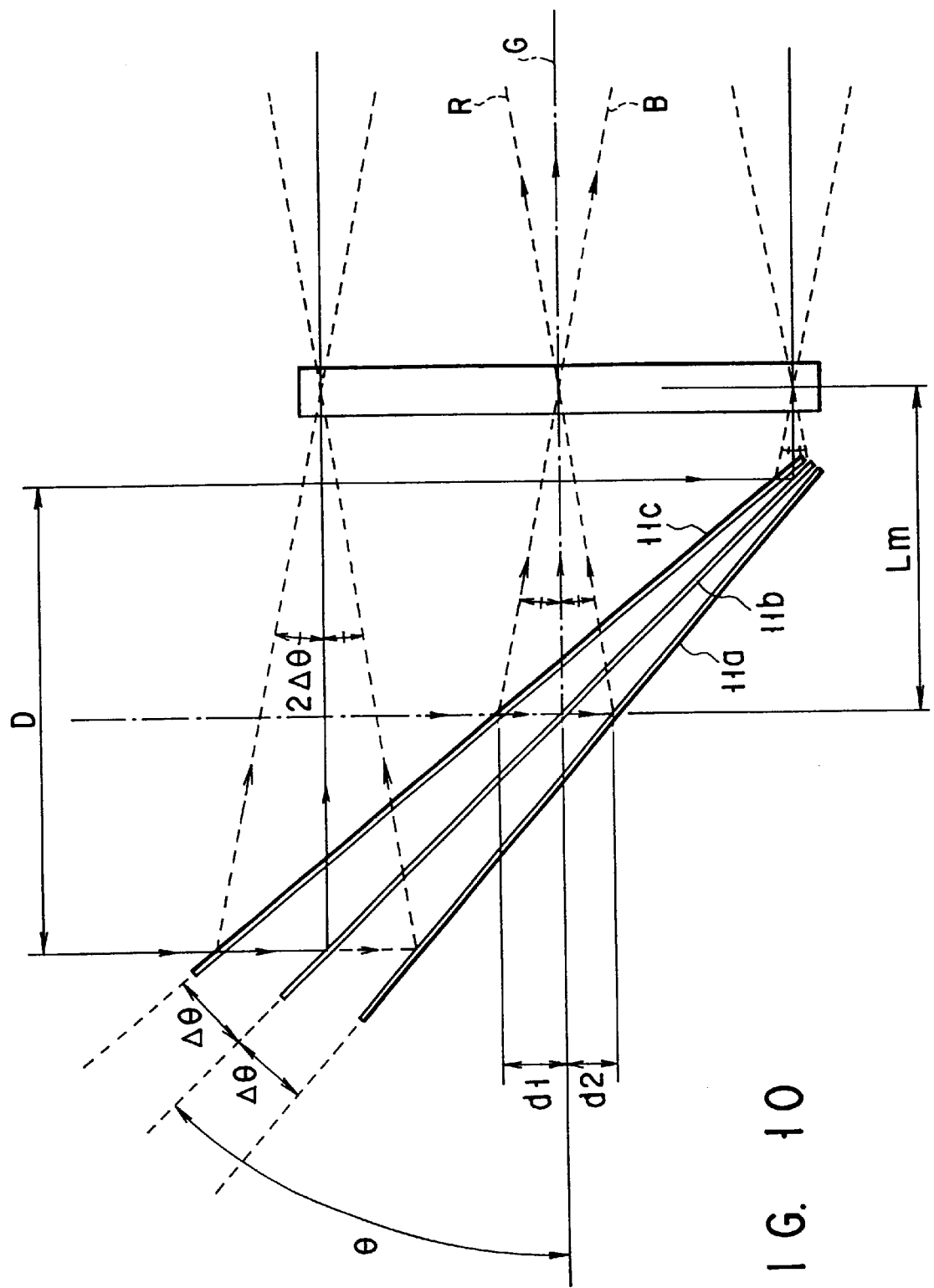
FIG. 10 is a view for explaining the spectral component direction separating means in FIG. 9.

A case wherein three dichroic mirrors are used as a color separation means and a spectral component direction separating means for causing a light beam to be incident on the liquid crystal display panel at a desired angle will be described below with reference to FIG. 10. The dichroic mirror can also be replaced with a prism, as a matter of course. As shown in FIG. 10, as for a white light beam collimated by the collimator lens 6, when dichroic mirrors 11a to 11c for reflecting blue light, green light, and red light, respectively, are used, and the arrangement angles of the mirrors 11a, 11b, and 11c are controlled, the angle of each color light beam incident on the liquid crystal panel can be controlled.

For example, a white light beam having a width D$_w$ is incident, reflected by the three mirrors almost inclined by an angle θ=45°, and incident on the liquid crystal panel while changing the angle by about 90°. A green light beam is almost perpendicularly incident on the liquid crystal panel. On the other hand, blue and red light beams are incident by positive and negative Δθ, respectively. These light beams are incident within the same range on the liquid crystal panel.

For this purpose, the angle of each of the three mirrors must be inclined by Δθ, and the central position, i.e., a point where the center of the incident light beam crosses the mirror must be shifted from the direction of the incident light beam by d$_1$ and d$_2$ represented by equations (18) and (19):

$$d_1 = L_m \{\tan(\theta + \Delta\theta) - \tan(\theta)\} \qquad (18)$$

$$d_2 = L_m \{\tan(\theta) - \tan(\theta - \Delta\theta)\} \qquad (19)$$

where L$_m$ is the distance between the center of the incident light beam and the display panel.

Similarly, when θ is not 45°, the mirrors are preferably arranged such that the light beams coincide with each other. Although the distances until the three light beams are incident on the display panel are different, the intensity distribution of the light beam normally changes in accordance with the distance because of a small non-parallel component of the incident light beam. For this reason, from a viewpoint of minimizing the display irregularity, it is important to equalize the optical lengths of the respective color beams. When differences in distance between the respective color light beams are to be preferentially decreased, d$_1$ and d$_2$ must be smaller than those in the above equations.

As an imaging optical system for guiding the color light beams having different angles to desired pixels of the liquid crystal panel, microlenses are used to perform display. More specifically, a plurality of adjacent pixels are called a pixel group (e.g., red, green, and blue), and a microlens is arranged on the incident side of the liquid crystal panel for each pixel group. Using a fact that the angle of the incident light beam changes depending on the wavelength, the unit pixel group is driven by video signals corresponding to the color light beams incident on the different pixels, thereby realizing color display.

The relationship between the spectral imaging optical system and the pixel group will be described below.

When a pixel group is constituted by three pixels corresponding to red R, green G, and blue B, the imaging optical system for each pixel group can use a lens having a size almost equal to that of the pixel group. A light beam having a wavelength corresponding to R is incident on the opening portion of an R pixel. A light having a G wavelength and a light beam having a B wavelength are incident on the opening portions of the G pixel and the B pixel, respectively.

Figure 11:
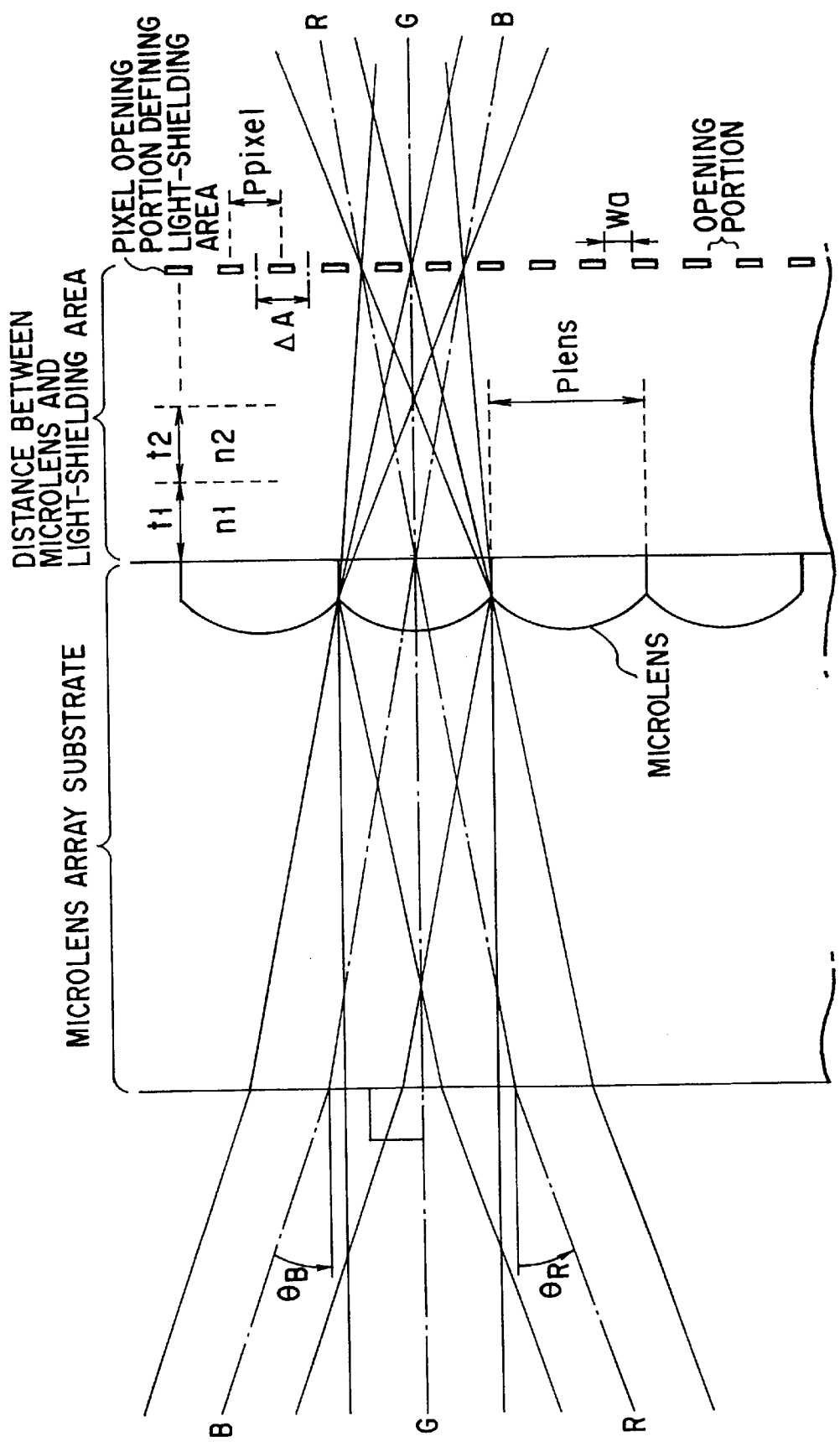
FIG. 11 is a view for explaining the spectral component coupling means in FIG. 9.

In this case, the relationship between the microlens array serving as an imaging optical system, a counter substrate, a light-shielding layer, the bonding layer for bonding the microlens, and the pixel opening portion are as shown in FIG. 11.

In FIG. 11, the G light beam is almost perpendicularly incident, and the B and R light beams are incident while having angles $\theta_R$ and $\theta_B$ with respect to the G light beam, respectively. A size $P_{lens}$ of the microlens and a size $P_{pixel}$ of the pixel on incident planes having the angles $\theta_R$ and $\theta_B$ are represented by relation (20):

$$P_{lens} \cong 3P_{pixel} \tag{20}$$

The R, G, and B light beams are incident on the opening portions of the corresponding pixels when a center-to-center distance $\Delta A$ between two pixels of the pixel group satisfies equation (21):

$$\Delta A \simeq \sum_{i=1}^{N} \frac{t_i}{\sqrt{\{(n_i/\sin\theta_0)^2 - 1\}}} \tag{21}$$

where $t_i$ and $n_i$ are the thickness and refractive index of materials of the counter substrate, the bonding layer, and the like arranged between the microlens and the light-shielding layer, and $\theta_0$ ($\theta_0 = \theta_r = -\theta_b$, $\theta_g = 0$) is the angle difference in the air between the light beams incident on the two pixels.

In fact, single color light supplied from the light source also has an angle distribution. When this angle distribution is not sufficiently smaller than that of each color beams formed by the spectral component direction separating means, a light beam which must be incident on the adjacent pixel is incident to mix colors. Therefore, the color reproducibility is degraded with respect to the colors separated by the spectral component direction separating means.

When a light beam is to be separated into three color light beams of R, G, and B, the magnitude of the angle distribution of each incident light beam corresponds to the width of an image of the incident light beam, which is formed on the light-shielding film portion. An angle distribution width $\theta_w$ of the incident light must satisfy relation (22) to obtain independent R, G, and B light beams without causing the R, G, and B light beams to overlap each other:

$$\theta_w < 2\theta_0 \tag{22}$$

More strictly, when a width a of the light-shielding portion and a width b of the opening portion are considered, and the distance $\Delta A = a+b$ of the opening portion of the pixel corresponds to $\theta_0$, relation (23) is established:

$$\theta_w < \theta_0(2a+b)/(a+b) \tag{23}$$

To cope with $\theta_w$, a stop is arranged near the second focal position of the elliptical condenser mirror, or a light source having a sufficiently short light-emitting length is used. In this case, light outside a necessary angle range can be removed. As $\theta_w$ becomes smaller, light is advantageously efficiently incident on the opening portion, as a matter of course. However, if this causes a large loss in light from the light source in the source light control means, the overall efficiency undesirably decreases. Therefore, optimization must be performed in the overall display apparatus.

When the angle distributions formed by the spectral component direction separating means are on the same plane, the three pixels are aligned in a line. As shown in FIG. 12B, when the pixels are aligned in a line, a cylindrical lens having a refracting power in one direction can also be used. A lens also having a refracting power in another direction can be more preferably used, as a matter of course. For example, a convex lens having a refracting power in all directions can be used.

When a cylindrical lens is used, the lens is preferably arranged such that the direction of the refracting power is set along the direction of pixels aligned in a line in the pixel group.

Figure 12A:
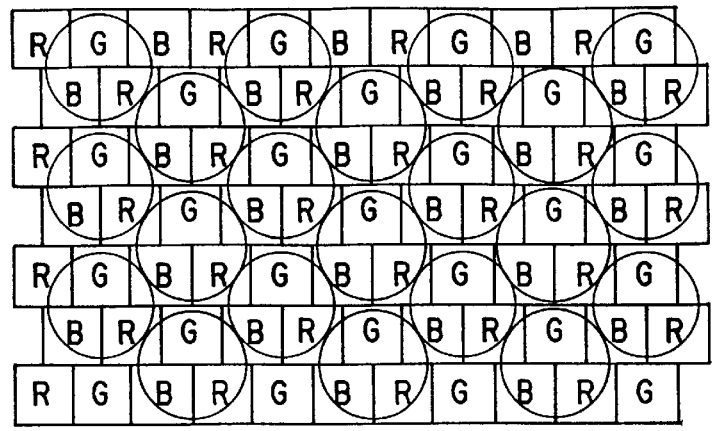
FIGS. 12A to 12C are views for explaining the relationship between a pixel arrangement and the spectral component coupling means in the projection-type display apparatus of the present invention.
Figure 12B:
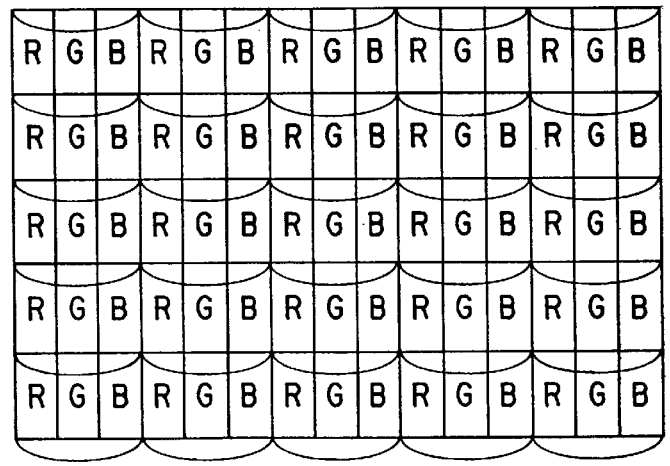
Figure 12C:
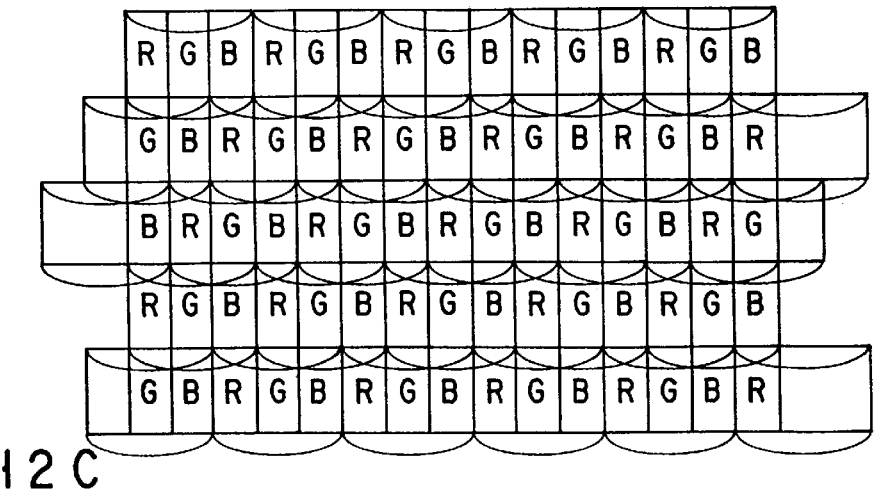

As shown in FIG. 12C, in a mosaic arrangement in which R, G, and B pixels are aligned as three adjacent pixels in one direction, and R, G, and B pixels are also aligned as three pixels in a vertical direction, the positions of the three color pixels are different both in the horizontal and vertical directions, and the positions where the imaging optical systems must be arranged are also different from each other. Therefore, the lenses must also be staggered.

As shown in FIG. 12A, pixels in a triangular arrangement can also be used. In this case, a lens which is rotationally symmetric with respect to the central point (optical axis) of the lens, e.g., a spherical convex lens can be arranged such that its center overlaps almost the center of the opening portions of three pixels in a pixel group. As an incident light beam, three color light beams having incident angles calculated reversely from the distance between the central axis of the lens and the center of the opening portions of the pixels by using the above relation can be incident.

Although the angle difference between the three color incident light beams is not present in the same plane, it can be realized using the above-described dichroic mirrors as spectral component direction separating elements to shift the three reflected color light beams in three directions.

When an imaging optical system having a refracting power in all directions is used, a light beam having an angle distribution which satisfies relation (25) in the respective directions must be incident while taking an angle $\theta_{wm}$ for satisfying equation (24) into consideration with respect to vertical and horizontal pitches $P = P_x$ and $P = P_y$ of the pixel arrangement:

$$P = \sum_{i=1}^{N} \frac{t_i}{\sqrt{\{(n_i/\sin\theta_{wm})^2 - 1\}}} \tag{24}$$

$$\theta < 2\theta_{wm} \tag{25}$$

Even with the arrangement of the spectral component direction separating means and the spectral component imaging means, when an area where an image is not normally formed is present at a boundary between the spectral component imaging means formed in correspondence with the pixel groups, a light beam incident on this portion exhibits an unexpected behavior, and a light beam having an unexpected wavelength may be incident on the pixel. Therefore, when the boundary portion between the spectral component imaging means poses a problem, a light-shielding film is preferably formed at this portion to suppress transmission of light.

A light source optical system consisting of a light source which is not frost-processed, an elliptical condenser mirror, and a collimator lens is used, and a stop means is arranged near the second focal position; In this case, a light beam emerging from the stop forms a light source having the shape of the stop, which corresponds to the position distribution obtained when the incident light beam is condensed on the liquid crystal panel. Since the collimator lens corresponds to the imaging optical system, when $P_{pixel}$ is formed into the shape of the stop, the angle distribution of a light beam emitted from this light source can be estimated. Alternatively, the shape of the stop can be designed such that the above angle conditions are satisfied.

Figure 13:
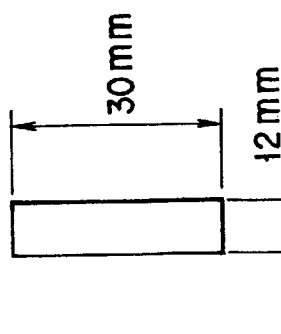
FIG. 13 is a view showing the shape of a stop used in the optical system shown in FIG. 9.

When a color imaging optical system has a refracting power in only a specific direction, i.e., when a color imaging optical system has a direction with no refracting power, the angle distribution in that direction is not regulated. Consider a cylindrical lens used as a color imaging optical system. The width of the stop can be set to satisfy the above equation in the direction with a refracting power, and the width can be increased in a direction perpendicular thereto. Therefore, an elliptical or rectangular stop as shown in FIG. 13 can be used. When the stop having an aspect ratio other than 1:1 is used, the major axis of the light-emitting portion of the light source is preferably set along the major axis of the stop, thereby efficiently converging the light beam to the stop.

A light source optical system which satisfies the above conditions is preferably used. Otherwise, a color filter can be added to a pixel in accordance with a wavelength distribution desired by each color, thereby preventing color mixture between adjacent pixels. Similarly, when the abilities of the spectral component direction separating means and the spectral component imaging means are not sufficient, a color filter can be supplementarily formed for a pixel to promote color separation.

Conditions for projecting a light beam emerging from the liquid crystal panel will be considered below.

To efficiently project light beams emerging from pixels at different angles, a projection lens having a sufficiently large entrance pupil diameter must be used as a projection optical system. More specifically, the angle distribution of a light beam emerging from the liquid crystal panel is a combination of the angle distribution $\theta_w$ of each color light beam generated in the light source, an angle distribution $\theta_s$ generated by the spectral component direction separating means, and an angle distribution $\theta_c$ generated by the spectral component imaging means.

Figure 14:
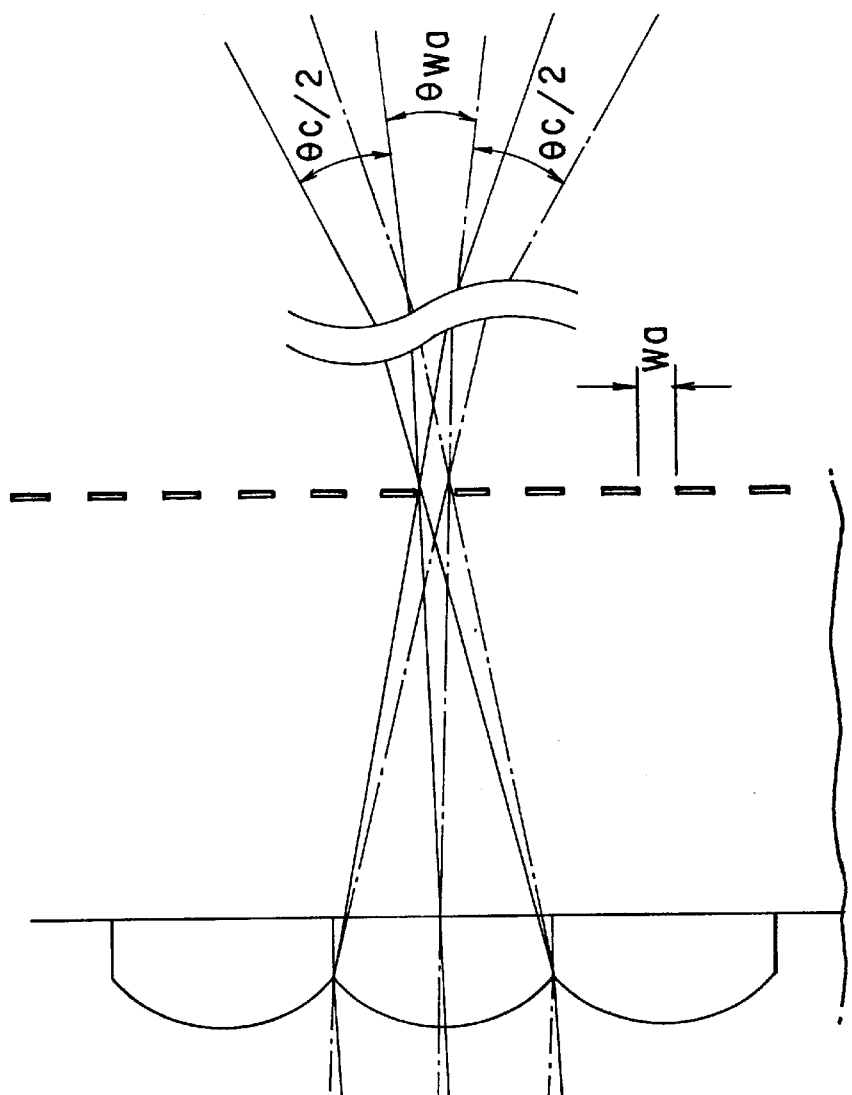
FIG. 14 is a view for explaining an angle distribution generated by the spectral component coupling means.

The angle distribution $\theta_w$ generated in the light source and the angle distribution $\theta_c$ generated by the spectral component imaging means are as follows. With respect to a width $W_a$ of the microlens serving as a spectral component imaging means and the opening portion of a given pixel, an angle distribution $\theta_{wa}$ of an incident light beam capable of transmitting through both the microlens and the pixel has a relationship represented by equation (26), as in the above description (FIG. 14):

$$W_a = \sum_{i=1}^{N} \frac{t_i}{\sqrt{\{(n_i/\sin\theta_{wa})^2 - 1\}}} \quad (26)$$

The incident angle $\theta_{wa}$ of transmissible light is compared with the angle distribution $\theta_w$ of a light beam incident from the light source, and the smaller one is defined as an effective incident angle distribution $\theta_{ew}$.

When the focal length f of the lens is converted to a focal length $f_{air}$ in the air, the angle distribution $\theta_c$ generated by the lens serving as a spectral component imaging means is represented by equation (27) with respect to the focal length $f_{air}$ and the incident diameter P of the lens:

$$\theta_c = 2\tan^{-1}\{P/(2f_{air})\} \quad (27)$$

The actual focal length f of the lens and the focal length $f_{air}$ in the air are represented by equations (28) and (29) with respect to the thickness $t_i$ and the refractive index $n_i$ (i=1, 2, ..., N) of N media through which a light beam emerging from the lens is transmitted up to the focal point is reached:

$$f = \sum_{i=1}^{N} t_i \quad (28)$$

$$f_{air} = \sum_{i=1}^{N} t_i / n_i \quad (29)$$

An angle distribution $\theta_{px}$ of exit light with respect to a single pixel is represented as follows:

$$\theta_{px} = \theta_{ew} + \theta_c \cong \theta_{wa} + \theta_c \quad (30)$$

The angle distribution of the light emerging from the entire pixel group is obtained by adding the angle $\theta_s$ generated by the spectral component direction separating means to the above $\theta_{px}$. $\theta_s$ is obtained by equation (31) representing a diameter $\Delta A_{max}$ of the smallest circle including the centers of the opening portions of all pixels which separate colors in a pixel group:

$$\Delta A_{max} = \sum_{i=1}^{N} \frac{t_i}{\sqrt{1 - (n_i/\sin\theta_s)^2}} \quad (31)$$

$\Delta A_{max}$ is the distance between the farthest pixels in the pixel group when the pixels in the pixel group are aligned on a straight line. For example, when the pixel group is constituted by three pixels arranged at the vertices of a regular triangle, $\Delta A_{max} = 2T/3$ with respect to the length T of a side of the regular triangle.

When $\theta_s$ is used, a distribution width $\theta_{out}$ of the final exit light beam is obtained by equation (32):

$$\theta_{out} = \theta_{px} + \theta_s \quad (32)$$

More specifically, when three pixels are aligned on a straight line, the maximum pixel-to-pixel distance is $2\Delta A$ which is twice $\Delta A$. This corresponds to $2\theta_0$ which is twice $\theta_0$. Therefore, by adding the above $\theta_{px}$, the distribution width $\theta_{out}$ of the final exit light beam is represented by relation (33):

$$\theta_{out} \cong \theta_{px} + 2\theta_0 \quad (33)$$

When a spectral component imaging means for pixels arranged in a triangle is provided, the maximum distance $\Delta A_{max}$ between the opening portions of three pixels can be applied to the above relation to obtain $\theta_s$ although the pixels in the pixel group are not aligned on a straight line.

To efficiently project light having the angle distribution of the exit light beam, a converging angle $\theta_{col}$ of the projection lens is preferably larger than the angle distribution $\theta_{out}$ of the exit light beam. More specifically, by using an f-number which is often used as a parameter representing the characteristics of a projection lens or a photographing lens, the converging angle $\theta_{col}$ can be expressed as follows:

$$F = \frac{1}{2\sin(\theta_{col}/2)} \quad (34)$$

However, to project a light beam having the distribution $\theta_{out}$ of the light emerging from the liquid crystal panel, the f-number of the projection lens must satisfy relation (35):

$$F \geq \frac{1}{2\sin(\theta_{out}/2)} \tag{35}$$

Figure 15:
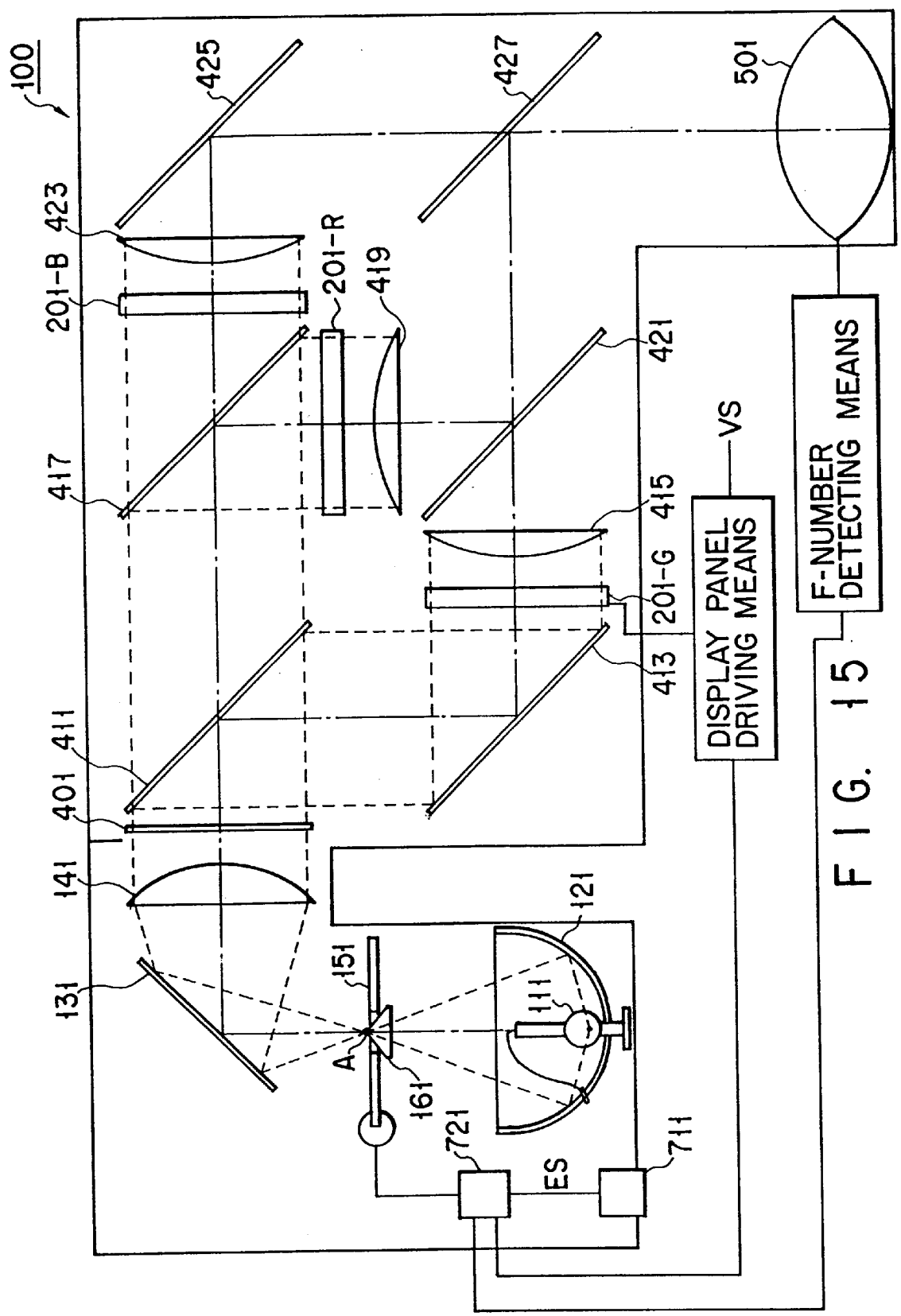
FIG. 15 is a view schematically showing a three-panel projection-type display apparatus according to an embodiment of the present invention.

A projection-type liquid display apparatus according to an embodiment of the present invention will be described below with reference to FIG. 15. As shown in FIG. 15, a projection-type liquid crystal display apparatus 100 is of a three-panel type, i.e., the projection-type liquid crystal display apparatus 100 has three liquid crystal panels 201-R, 201-G, and 201-B for red (R), green (G), and blue (B).

The light source optical system of the projection-type liquid crystal display apparatus according to this embodiment has a spheroidal reflecting mirror 121, a clear type DC lighting 250-W metal halide light source (arc length: 3 mm) 111 without being frost-processed, which is arranged near the first focal position of the reflecting mirror 121, a cold mirror 131, and a collimator lens 141.

A source light beam from the light source 111 is temporarily condensed near the second focal point by the elliptical reflecting mirror 121, transmitted through the cold mirror 131, collimated by the collimator lens 141, and guided to the liquid crystal panels 201-R, 201-G, and 201-B. A microlens serving as a source light beam converging means is arranged on the incident side of each liquid crystal panel. A field lens and a projection lens are arranged on the exit side of each liquid crystal panel.

An elliptical condenser mirror 121 has shape parameters such as a major axis A=60 mm and a minor axis B=44.72 mm. As for the arrangement of the optical system, the distance from the center of the ellipse to the first or second focal point is 40 mm, and the focal length of the collimator lens is 147 mm.

In the projection-type liquid display apparatus according to this embodiment, the light source 111 is fixed perpendicularly to the elliptical reflecting mirror 121 for the purpose of easily ensuring the positional accuracy with respect to the elliptical reflecting mirror 121. With this arrangement, a light beam at the central portion of the source light beam becomes small due to the influence of the electrode and the like of the light source 111. For this reason, in the light source optical system of the projection-type liquid crystal display apparatus according to this embodiment, a convex conical lens 161 (vertical angle: 120°) is arranged between the light source 111 and a stop means 151 on the stop means 151 side.

This conical lens 161 acts as an optical element (void correction element) for preventing a decrease in intensity at the central portion of the light beam, which is caused by light shielding by the electrode portion and the like of the light source, i.e., correcting the beam direction. In place of the convex conical lens 161, a concave conical lens, one or a plurality of grating lenses, a diffuser, or the like may also be used as far as it guides, to the central portion, the light beam which diverges and is not efficiently utilized. The vertical angle of the conical lens is preferably 100° to 140°. However, it may also be optimized in accordance with the refractive index of a glass material used for the lens.

When the light source is arranged perpendicularly to the elliptical reflecting mirror, the void correction element need not always be used. FIG. 15 also shows a stop control means 721 capable of controlling the brightness and illuminance irregularity, and a detection means 711 for detecting a screen illuminance or an ambient illuminance, both of which can be added to the apparatus as needed.

The arrangement of the liquid crystal panels 201-R, 201-G, and 201-B will be described below. Of source light from the light source optical system through a UV-IR filter, only green (G) light is reflected by a first dichroic mirror 411. The green (G) light is reflected by a second total reflecting mirror 413 and guided to the liquid crystal panel 201-G. The green (G) light is transmitted through the liquid crystal panel 201-G and emerges through a first field lens 415.

Of the source light transmitted through the first dichroic mirror 411, only red (R) light is reflected by a second dichroic mirror 417 and guided to the liquid crystal panel 201-R. The red (R) light transmitted through the liquid crystal panel 201-R is transmitted through a second field lens 419 and synthesized by a first synthesizing mirror 421 with the green (G) light transmitted through the liquid crystal panel 201-G.

The source light transmitted through the second dichroic mirror 417 is guided to the liquid crystal panel 201-B. Blue (B) light transmitted through the liquid crystal panel 201-B reaches a second synthesizing mirror 427 through a third field lens 423 and a third total reflecting mirror 425, is synthesized with the red (R) light and the green (G) light, which are transmitted through the liquid crystal panels 201-R and 201-G, respectively, and synthesized with each other, and guided to the projection optical system.

The liquid crystal panels 201-R, 201-G, and 201-B will be described below. The liquid crystal panels 201-R, 201-G, and 201-B have the same arrangement except for the driving systems, and the liquid crystal panel 201-G for green (G) will be exemplified below. In the liquid crystal panel 201-G, 640 display pixels are aligned in the horizontal direction, and 480 display pixels are aligned in the vertical direction at a pitch of 100 $\mu$m. As shown in FIG. 15, a pair of polarizing plates 203 and 205 are arranged on the two major surfaces of the liquid crystal panel 201-G, which are separated from each other by a predetermined distance, while the polarizing axes are almost perpendicular to each other.

Figure 16:
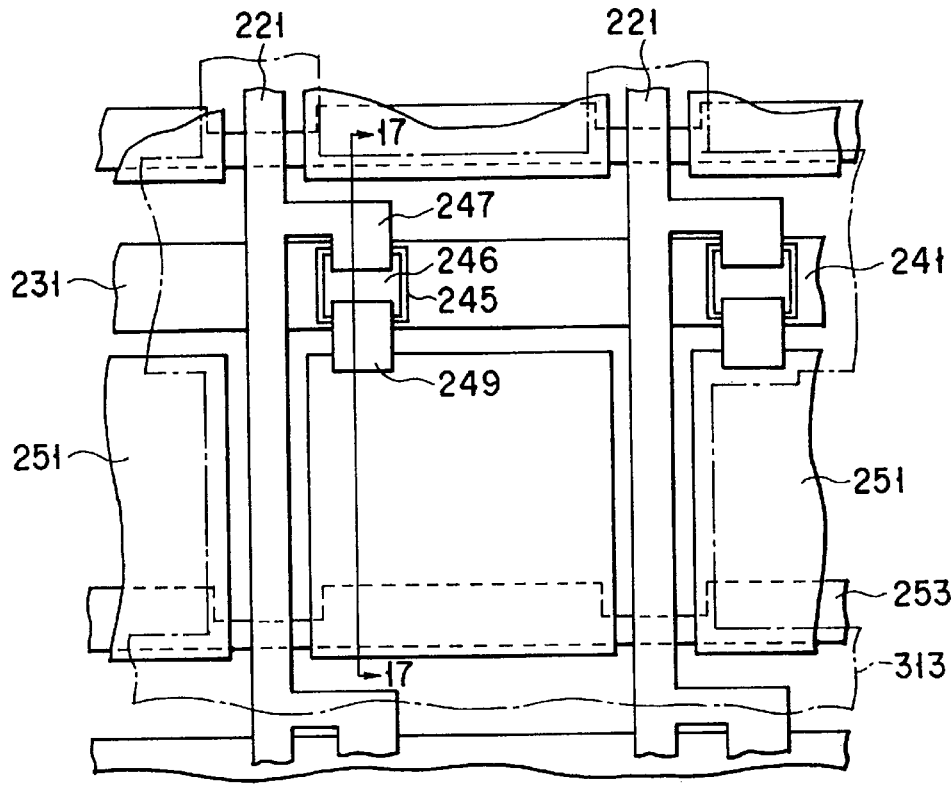
FIG. 16 is a plan view showing part of a liquid crystal panel of the display apparatus shown in FIG. 15.
Figure 17:
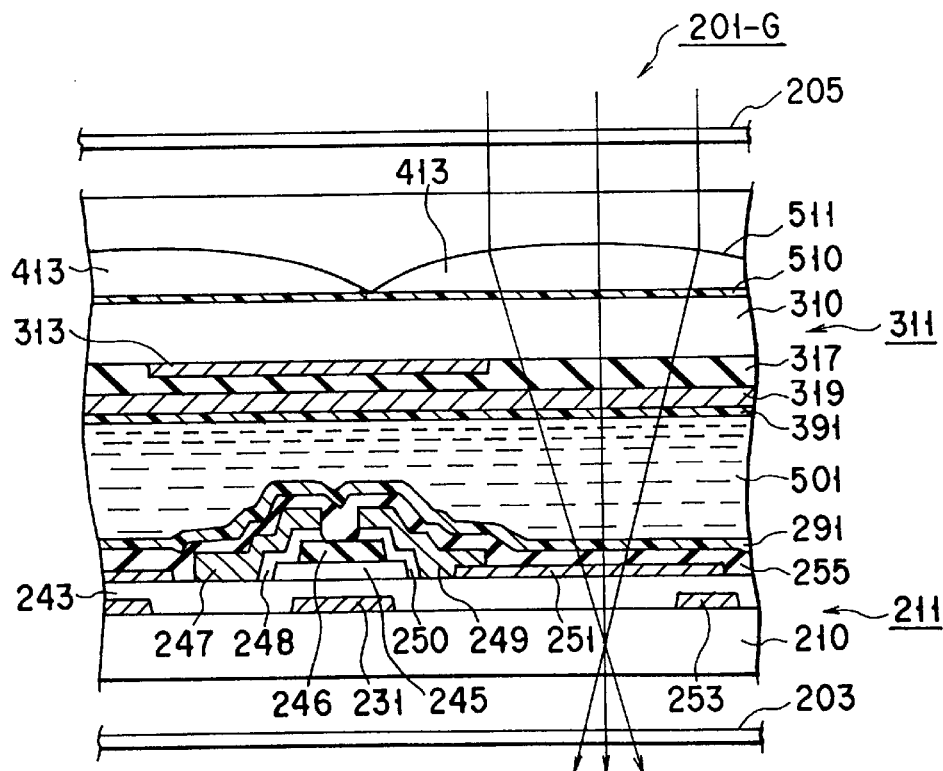
FIG. 17 is a sectional view taken along a line 17—17 in FIG. 16.

In the liquid crystal panel 201-G, as shown in FIGS. 16 and 17, a TN liquid crystal 401 is held between an array substrate 211 and a counter substrate 311 through an aligning films 291 and 391 while being twisted by 90° between the substrates 211 and 311.

In the array substrate 211, signal lines 221 and a scanning line 231 which are almost perpendicular to each other are arranged on a transparent glass substrate 210 having a thickness of 0.7 mm, as shown in FIG. 16. Each thin-film transistor (to be referred to as a TFT hereinafter) 241 is arranged near the intersection of the corresponding signal line 221 and the scanning line 231. As shown in FIG. 17, the TFT 241 has a gate electrode formed of the scanning line 231 itself, a thin amorphous silicon film 245 as a semiconductor layer formed on the scanning line 231 through a gate insulating film 243, and a semiconductor protective film 246 which consists of silicon nitride formed in self-alignment with respect to the scanning line 231 to protect the thin amorphous silicon film 245 and suppress the parasitic capacitance.

The TFT 241 also has a drain electrode 247 which extends from the signal line 221 and electrically connects the thin amorphous silicon film 245 to the signal line 221 through an $n^+$-type thin amorphous silicon film 248, and a source electrode 249 which electrically connects a pixel electrode 251 consisting of ITO (Indium Tin Oxide) arranged in an area surrounded by the signal line 221 and the scanning line 231 to the thin amorphous silicon film 245 through an $n^+$-type thin amorphous silicon film 250. In this manner, the TFTs 241 having an inverted staggered structure are formed.

A supplementary capacitance line 253 for forming a supplementary capacitance (Cs) with respect to the pixel electrode 251 through the gate insulating film 243 is arranged almost parallel to the scanning line 231. A protective film 255 is arranged on the TFT 241 and the pixel electrode 251. The array substrate 211 has the above structure.

In the counter substrate 311, a matrix light-shielding layer 313 consisting of chromium (Cr) for shielding light to the peripheral portions of the TFT 241 and the pixel electrode 251 of the array substrate 211, a protective film 317 arranged on the light-shielding layer 313, and an opposite electrode 319 consisting of ITO arranged on the protective film 317 are formed on a transparent glass substrate 310 having a thickness of 0.7 mm. The liquid crystal panel 201-G having the above structure achieves an aperture ratio of 36%.

As shown in FIG. 15, the microlens array substrate 511 is bonded to the major surface of the counter is substrate 311 (thickness: 0.7 mm) through a bonding layer 510. The thickness of the bonding layer 510 is about 20 $\mu$m. The microlens array substrate 511 is constituted by a group of condenser lenses 513 each corresponding to a display pixel. The focal position of the condenser lens 513 is set to be present in the glass substrate 210 constituting the array substrate 211. The focal length of the microlens is 0.6 mm in the air.

Experiments about the brightness improvement effect in the three-panel optical system having the above optical parameters and arranged in the liquid crystal panel with microlenses having the above arrangement will be described below.

When a liquid crystal panel using the same optical system but no microlens was used, the nine-point average luminous flux was 249 lm (the nine-point average luminous flux is obtained when a light beam is projected onto a 40-inch screen, and the average value of the projection illuminances at the centers of nine rectangles formed by dividing the projection screen into 3×3 is multiplied by the projection area).

In the liquid crystal panel with microlenses, the nine-point average luminous flux was 3.74 lm which improved the brightness to about 1.5 times (effective aperture ratio: 54%) that of the liquid crystal panel without microlens. The value $W_p = m \cdot Q_2/(f \cdot n)$ is 50.3 $\mu$m which is sufficiently smaller than $2\sqrt{(S/\pi)} = 110.6$ $\mu$m (wherein $\theta_2$ in $Q_2$ is 30°).

An experiment was conducted while the distance m between the microlens and the pixel was decreased to decrease the value $W_p$. The similar experiment was conducted using a counter substrate whose thickness was set to 0.5 mm to decrease the distance m. As a result, the nine-point average luminous flux became 405 lm which was 1.62 times (effective aperture ratio: 59%) that of the liquid crystal panel without microlens. When the thickness of the counter substrate is decreased, the values m and $W_p$ are decreased accordingly. Therefore, the improvement effect for the effective aperture ratio by the microlens is increased.

Data of dependency of the focal length f of the collimator lens, which is another parameter, will be described below. In the above optical system, light eclipsed by the collimator lens portion can be suppressed by decreasing the focal length of the collimator lens. When f=110 mm even in a liquid crystal panel without microlens, the nine-point average luminous flux becomes 338 lm which is about 1.35 times.

When the focal length of the collimator lens is decreased, the total luminous flux increases although the converging angle of light incident on the liquid crystal panel increases. The converging angle was measured in accordance with two values f. When f=147 mm, the total angle was about 8° (±4°), and when f=110 mm, the total angle was about 12° (±6°) (the converging angle was defined as the width of total angle for obtaining a 50% light intensity of a peak light intensity). For this reason, although the total luminous flux is increased, the improvement effect for the effective aperture ratio by the microlens in the panel with microlenses is expected to be decreased because of a degradation in parallelism of incident light.

When a liquid crystal panel with microlenses, which has a 0.7-mm thick counter substrate, is used at f=110 mm, the nine-point average luminous flux is 420 lm which is brighter than that at f=147 mm. This is 1.68 times that of the liquid crystal panel without microlens at f=147 mm. However, the effective aperture ratio is 46% and lower than that at f=147 mm. When f is decreased, the value $W_p$ is increased. Therefore, although the improvement effect for the effective aperture ratio by the microlens is decreased, the total brightness can be improved because the total luminous flux to the liquid crystal panel becomes 1.35 times.

When f=110 mm and a 0.5-mm thick counter substrate is used, the nine-point average luminous flux becomes 493 lm which is brighter than that obtained when f=147 mm, and a 0.5-mm thick counter substrate is used. This is 1.97 times that obtained when f=147 mm, and a liquid crystal panel without microlens is used. The effective aperture ratio is 53%. When the thickness of the counter substrate is decreased, and the value $W_p$ is decreased, the microlens effect is increased, as described above. In any case, $$W_p < 2\sqrt{(S/\pi)}$$

is satisfied, as a matter of course.

Figure 19:
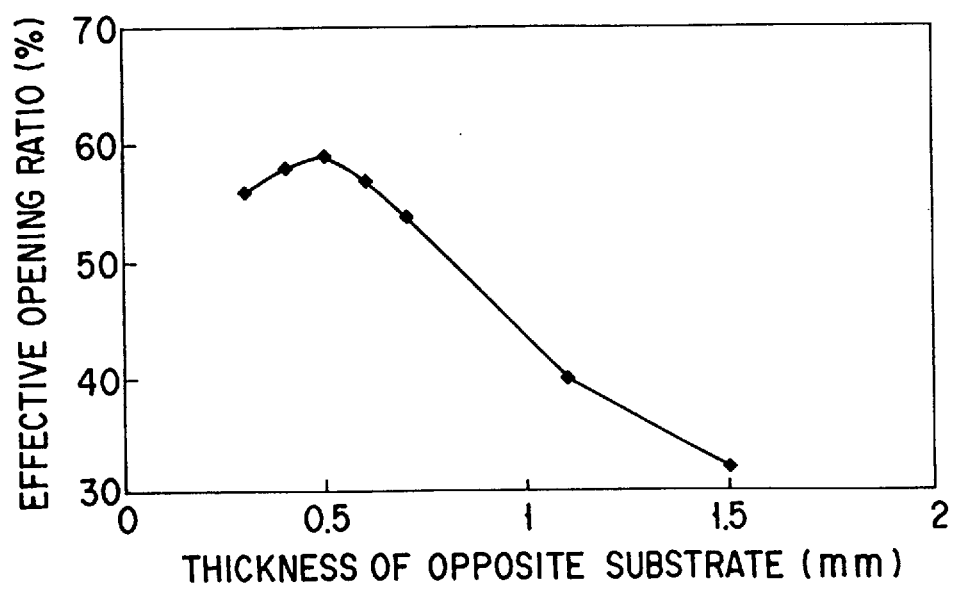
FIG. 19 is a graph showing the thickness of a counter substrate and the effective aperture ratio.

FIG. 19 is a graph showing measurement values representing the influence of the effective aperture ratio by the microlens effect with respect to a change in thickness of the counter substrate, which thickness contributes to the distance m between the microlens substrate and the light-shielding area for defining the opening portion of the modulation element (focal length f of the collimator lens is 147 mm). The maximal value is obtained when the thickness of the counter substrate is about 0.5 mm. With a larger thickness of the counter substrate, the effective aperture ratio largely decreases. With a larger thickness of the counter substrate, the transmittance is decreased beyond the aperture ratio (36%) of a panel without microlens.

The light-emitting length L of the light source also determines the value $W_p$. In the above embodiment, a light source having an interelectrode length of 3 mm is used. However, this length is preferably optimized in consideration of the total luminous flux and the improvement effect for the effective aperture ratio by the microlens, as a matter of course. A larger interelectrode length may also be used, and the length can be optimized in accordance with all the parameters including the shape of the elliptical condenser mirror.

As described above, in accordance with the shape parameters (major and minor axes A and B) of the elliptical condenser mirror and the light-emitting length L of the light source, and the converged luminous flux diameter $Q_1$ at the second focal position or the value $Q_2$ when an element for correcting the beam direction is arranged, the microlens effect can be optimized. In place of $Q_1$ and $Q_2$, the converging angle of light incident on the liquid crystal panel may also be controlled by arranging a stop means near the second focal position, as a matter of course.

Conditions for increasing the microlens effect are represented by relations (36) and (37) if the diameter of the stop means is defined by D:

$$m \cdot D / (f \cdot n) < 2\sqrt{(S/\pi)} \quad (36)$$

The converging angle $\theta_w$ of light incident on the liquid crystal panel can be obtained by the following equation in accordance with the above D and the focal length f of the collimator lens:

$$\theta_w = 2 \tan^{-1}(D/2f) \quad (37)$$

Figure 20:
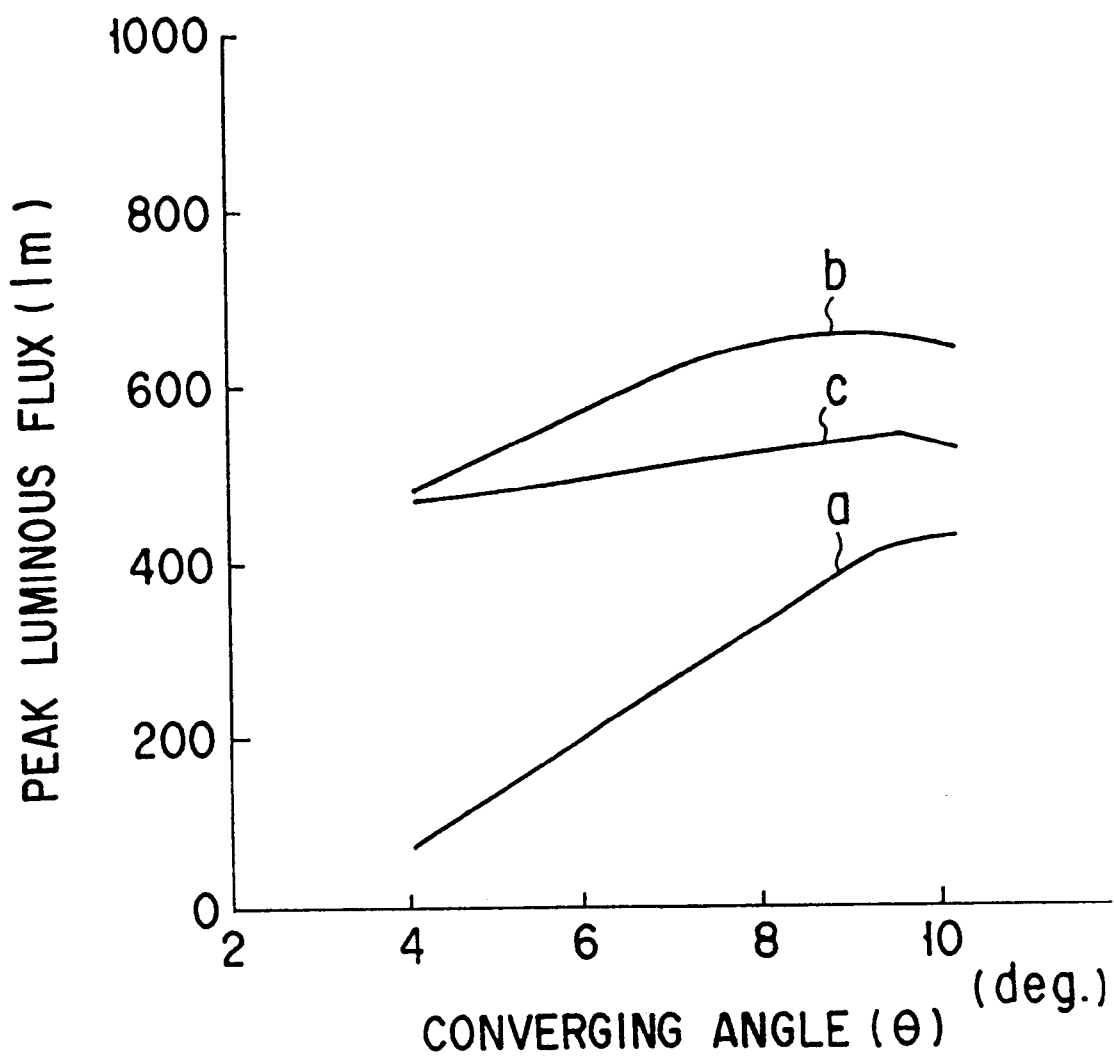
FIG. 20 is a graph showing the dependency of a peak light beam on the converging angle.

FIG. 20 is a graph showing the dependency of the peak luminous flux (lm) obtained by multiplying the display area (0.498 m$^2$ in a 40-inch screen having an aspect ratio of 4:3) by the maximum illuminance near the screen center on the converging angle. The converging angle was changed by controlling the stop diameter. As shown in FIG. 17, when a liquid crystal panel without microlens (curve a) is used, the peak luminous flux largely decreases as the converging angle $\theta_w$ becomes smaller. When a liquid crystal panel with microlenses is used (curves b and c), the degree of decrease is small. This is because the improvement effect for the effective aperture ratio by the microlens is increased as the converging angle becomes smaller, and the parallelism of incident light is improved.

As described above, as for the microlens effect, the improvement effect for the effective aperture ratio is increased by optimizing (in the above case, decreasing) the thickness of the counter substrate in correspondence with the pixel size. This is apparent from facts that the brightness is largely improved, and the degradation in brightness caused by a decrease in converging angle is small in use of a 0.5 mm thick counter substrate (curve c) rather than in use of a 0.7 mm thick counter substrate (curve b), as shown in FIG. 20.

The stop means can be advantageously used to decrease the illuminance irregularity of a display image although a decrease in converging angle of light incident from the liquid crystal panel causes a degradation in brightness.

Figure 18:
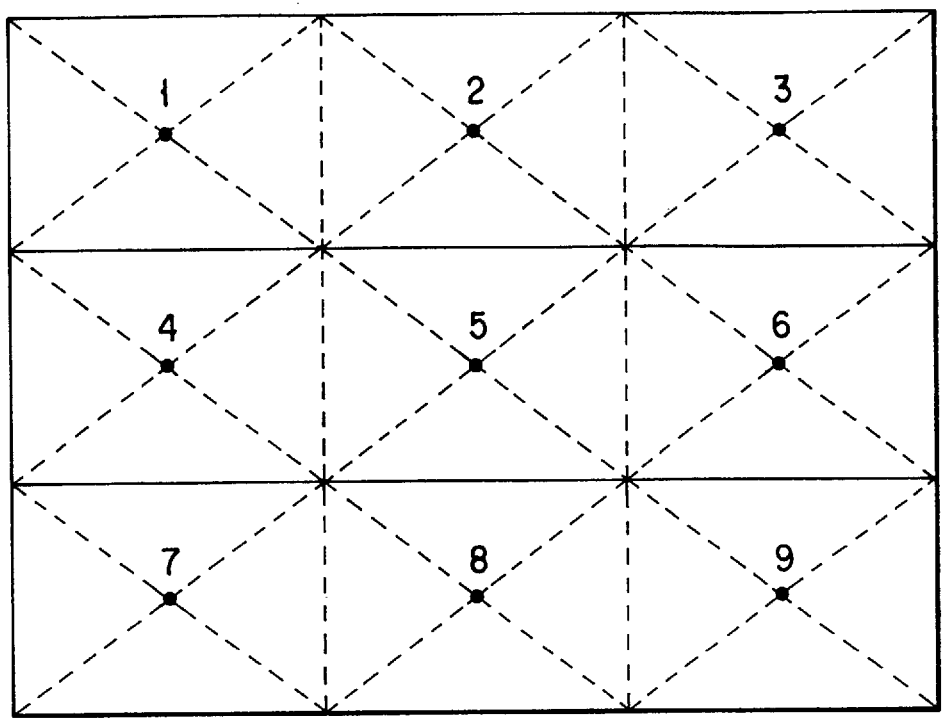
FIG. 18 is a view showing illuminance measurement points in a projected display image.

Table 1 shows the measurement result of illuminance irregularity of a display image in the three-panel projection-type display apparatus 100, and the measurement result of luminance irregularity of a display image in the conventional projection-type display apparatus 901 shown in FIG. 1 as a comparative example. As for the display image, a full white image was enlarged and projected onto a screen with a 40-inch diagonal. Illuminances at nine points on the display image shown in FIG. 18 were measured by an illuminometer and represented as ratios to the illuminance at point 5 which was defined as 100. The converging angles ($\theta$) of examples were set to 8°, 6°, and 4°.

TABLE 1

|  | Point 1 | Point 2 | Point 3 | Point 4 | Point 5 |
|---|---|---|---|---|---|
| Example 1 (8°) | 32 | 61 | 30 | 38 | 100 |
| Example 2 (6°) | 42 | 68 | 40 | 47 | 100 |
| Example 3 (4°) | 59 | 87 | 57 | 64 | 100 |
| Control | 23 | 43 | 24 | 27 | 100 |

TABLE 1-continued

|  | Point 6 | Point 7 | Point 8 | Point 9 |
|---|---|---|---|---|
| Example 1 (8°) | 38 | 33 | 60 | 32 |
| Example 2 (6°) | 48 | 45 | 69 | 40 |
| Example 3 (4°) | 65 | 55 | 84 | 56 |
| Control | 26 | 20 | 40 | 24 |

As shown in Table 1, according to the projection-type display apparatus 100 of this embodiment, a satisfactory display image with a very small luminance irregularity at the central and peripheral portions of the display image can be obtained as compared to the conventional projection-type display apparatus.

In the projection-type display apparatus according to this embodiment, when the illumination illuminance on the screen is high, i.e., in a bright environment, an image having a larger contrast ratio is visually recognized as a satisfactory display image rather than small display luminance irregularity. Therefore, the converging angle $\theta_w$ of the stop means 151 can be controlled within a sufficiently large range by using a stop control means 721.

When the illuminance on the screen is low, i.e., in a dark environment, an image having a small display luminance irregularity is visually recognized as a satisfactory display image. Therefore, the stop means can also be controlled such that the converging angle $\theta_w$ is controlled within a relatively small range for decreasing the luminance irregularity. In addition, when a single display image is divided into a plurality of blocks and displayed, the decrease in luminance at the boundaries between the blocks can be made unclear by controlling the converging angle $\theta_w$ within a relatively small range.

For example, according to the projection-type display apparatus 100 of this embodiment, when the screen illuminance is 30 (lx) where the illumination environment is slightly dark in, e.g., a variety of show rooms or AV rooms, the converging angle $\theta_w$ is set to 4° to 6°. With this arrangement, the decrease in illuminance at point 1 with respect to point 5 in FIG. 18 can be suppressed to 40% to 60% while ensuring a contrast ratio of 100:1 or more. Since an image having a small display luminance irregularity and a high contrast ratio can be displayed, a satisfactory display image can be visually recognized.

When the screen illuminance is 200 (lx), e.g., in an illumination environment of a general office or house, the converging angle $\theta_w$ is set to 8° or more. With this arrangement, a peak luminous flux of 500 (lm) or more can be obtained. In addition, a decrease in illuminance at point 1 with respect to point 5 can be suppressed to about 30% with which the display irregularity is hardly visually recognized. Therefore, a satisfactory display image is visually recognized.

As described above, the projection-type display apparatus 100 according to this embodiment has a unique light source optical system. With this arrangement, the converging angle $\theta_w$ of the source light is controlled such that the converging angle $\theta_w$ becomes small as the screen illuminance is decreased, thereby preventing a luminance irregularity of a display image. At the same time, a display illuminance according to the screen illuminance can be obtained.

Figure 21:
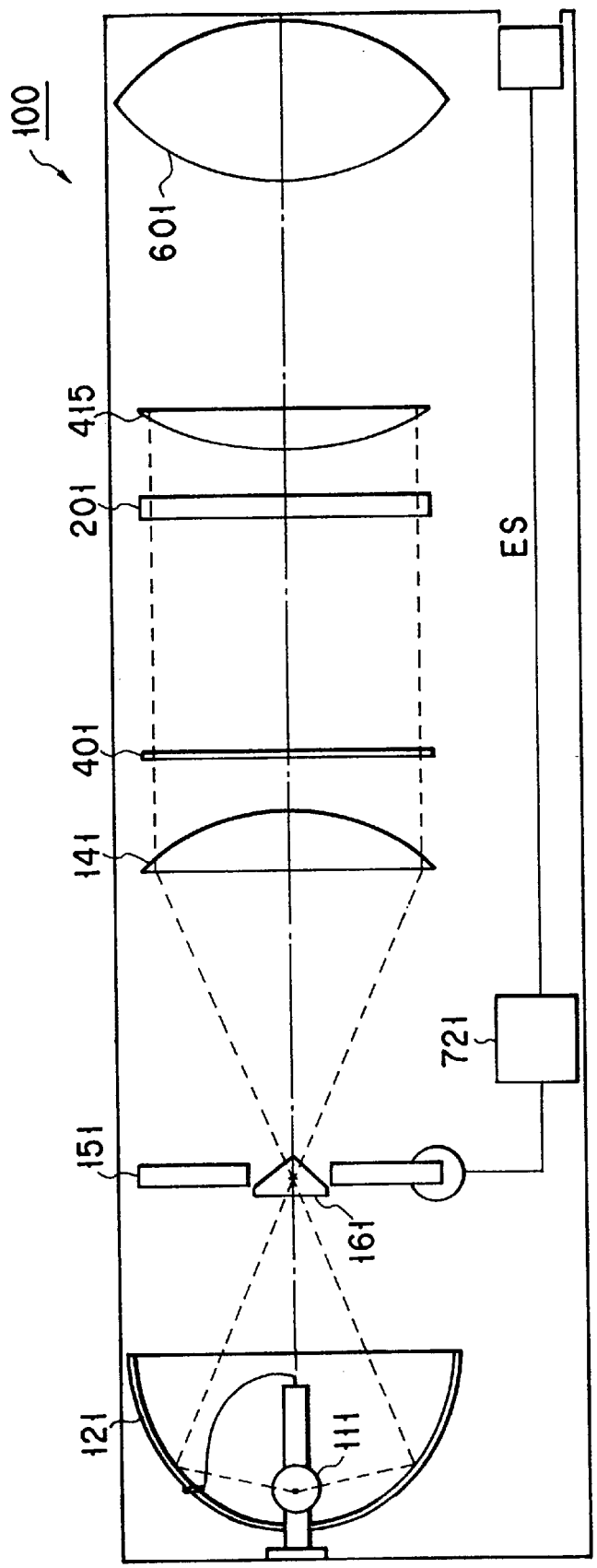
FIG. 21 is a view schematically showing a single-panel projection-type display apparatus according to another embodiment of the present invention.

In this embodiment, the three-panel projection-type display apparatus 100 has been exemplified. However, the single-panel projection display apparatus 100 as shown in FIG. 21 in which the liquid crystal panel itself has a color filter consisting of at least primary color units arranged in a stripe, mosaic, or delta shape may also be used, as a matter of course.

In addition, a stop means for controlling the converging angle $\theta_w$ of source light may be provided for each of the liquid crystal panels 201-R, 201-G, and 201-B, thereby individually controlling the converging angle $\theta_w$ of light source in units of colors. Such a feature can also be applied to a liquid crystal panel without microlens, as a matter of course.

Furthermore, in this embodiment as shown in FIG. 15, the converging angle $\theta_w$ of the stop means 151 can also be controlled by the stop control means 721 in accordance with an ambient illuminance signal ES from the illuminance detection means 711. The converging angle may also be controlled on the basis of the luminance signal of a video signal VS supplied from display panel driving means to the liquid crystal panels 201-R, 201-G, and 201-B, or by a combination thereof.

For example, on the basis of the difference between the time-averaged intensity of the luminance signal included in the video signal and the blanking level (black level) of the luminance signal, the converging angle $\theta_w$ is controlled to be small when the difference is small, or to be large when the difference is large. With this arrangement, a satisfactory display image can be ensured independently of the display luminance of the display image.

In this embodiment, the converging angle $\theta_w$ is controlled by controlling the opening diameter D of the stop means 151 by the stop control means 721. However, the converging angle $\theta_w$ may also be controlled by moving the stop means 151 along the optical axis of the light source 111 to control the effective opening diameter D.

For the light source used in the above embodiment, frost processing for diffusing source light is not performed. This is because this light source can be effectively used to increase the condensing efficiency of source light to the stop means. However, a frost-processed light source can also be used, as a matter of course. In addition, in this embodiment, a DC lighting light source is used. This is because the DC lighting light source can be optimally used in the above optical system from a viewpoint of decreasing the light-emitting distribution between the anode and the cathode as compared to an AC lighting light source. However, an AC lighting light source may also be used, as a matter of course.

As in the above embodiment, the microlenses may be arranged either on only the incident side or on both the incident and exit sides. When the microlens array substrate 411 is arranged on only the incident side, light converged near the light-shielding layer 313 of the counter substrate 311 by the microlens array substrate 411 may be eclipsed by the projection lens because of its later divergence, resulting in a decrease in light utilization efficiency. For this reason, to use the first dichroic mirror 411, selection of the focal position of each condenser lens 413 of the first dichroic mirror 411 is important.

More specifically, the focal position must be set such that source light diverging after converged by each condenser lens 413 sufficiently falls within the range of each field lens. Particularly, to achieve a compact field lens, the focal position of each condenser lens 413 is preferably set far apart from the light incident side. However, as the focal position of each condenser lens 413 becomes far from the light incident side, the effect of the microlens array substrate 411 decreases, resulting in a decrease in effective aperture ratio of the liquid crystal panel 201-G. Therefore, the focal position of each condenser lens 413 need be set not in the TN liquid crystal 401 but in the substrate on the exit side or outside the substrate.

Especially, in this embodiment, the thickness of the glass substrate 310 of the counter substrate 311 is 0.7 mm or less. For this reason, the focal position of each condenser lens 413 need be set at a position separated from the microlens array substrate 411 by 0.8 to 1.1 mm, i.e., in the glass substrate 210 such that transmitted light sufficiently falls within the range of the first field lens 415.

More specifically, when the microlens is arranged on the incident side of the liquid crystal panel, light condensed by the microlens diverges later, so the effective aperture ratio of the projection-type display apparatus largely depends on the f-number of the projection lens, as shown in FIGS. 23A to 23C. That is, when the focal length of the microlens is short, modulated light transmitted through each liquid crystal panel largely diverges until it is incident on the projection lens. To improve the brightness of the projection-type display apparatus, the lens diameter of the projection lens must be increased, or the focal length must be decreased. As a result, the f-number is decreased.

FIGS. 23A to 23C are graphs showing the dependency of the effective aperture ratio on the f-number, in which the effective aperture ratio of the projection-type display apparatus with microlenses is plotted along the abscissa, and the f-number of the projection lens is plotted along the ordinate. FIG. 23A shows a case wherein the converging angle of source light is 4°. In FIG. 23A, curves (A) to (E) represent cases wherein the effective focal positions of the microlens (considering the refractive index of the counter substrate, and the like) are 0.56, 0.7, 0.84, 1.05, and 1.4 mm, respectively. FIGS. 23B and 23C show cases wherein the converging angles of source light are 6° and 8°. As is apparent from FIGS. 23A to 23C, when the focal length of the microlens is decreased, the dependency on the f-number of the projection lens increases.

In the projection-type display apparatus, a zoom projection lens is used to enable enlargement/reduction of a projected video image. The f-number of the projection lens is about four on the wide-angle side, though it becomes as large as five on the telephoto side. For this reason, in the projection-type display apparatus, it is preferable that the brightness of a display image be hardly influenced by variations in f-number of the projection lens. More specifically, when a video image is to be projected from the projection-type display apparatus far from the screen, the image is projected on the telephoto side. When enlargement of the image is likely to cause a decrease in ambient luminance, it is preferable that the stop diameter be decreased by the stop means to control the converging angle small, from a viewpoint of minimizing the luminance irregularity.

As described above, in the projection-type display apparatus, the focal length of the microlens cannot always be effectively decreased. To improve the total effective aperture ratio, the focal position of the microlens in the projection-type display apparatus is preferably set in the liquid crystal layer, or on the exit-side substrate (array substrate in this embodiment).

By setting the focal position of the microlens as described above, the lens diameter of the projection lens can be designed with a degree of freedom, and a compact and inexpensive apparatus can be achieved. In addition, by setting the focal length of the microlens as described above, variations in effective aperture ratio of the projection-type display apparatus can be suppressed even when the f-number of the projection lens varies in accordance with enlargement/reduction of a display image, and at the same time, a uniform display image luminance can be obtained.

To ensure a more uniform display image when the f-number of the projection lens varies, the opening diameter of the stop means 151 may be controlled in accordance with variations in f-number detected by f-number detection means, as shown in FIG. 15. When the projection lens is set on the telephoto side in long-distance projection, the f-number becomes large, resulting in an increase in luminance irregularity. However, when the stop diameter of the stop means is decreased to decrease the converging angle, such a decrease in luminance irregularity can be suppressed. To the contrary, to improve the brightness at the center, the opening diameter of the stop means can be increased to increase the converging angle, thereby improving the total brightness.

A curve (c) in FIG. 20 represents the dependency of a peak luminous flux on the converging angle when the f-number of the projection lens is 5, and the focal position is set at a position separated from the microlens by 1.4 mm on the projection lens side while a curve (b) in FIG. 20 represents a case wherein the focal position of the microlens is set at a position separated from the microlens substrate by 0.8 mm.

As is apparent from FIG. 20, when the focal length of the microlens is increased, the peak luminous flux itself slightly decreases. However, the dependency of peak luminous flux on the converging angle can be further decreased. By setting a small converging angle, uniformity of display luminance can also be improved.

In the above embodiment, a servomotor is incorporated as the stop control means shown in FIG. 15, and the circular opening diameter is changed by the servomotor. However, the opening may also be rectangular or elliptical. In addition, a light-shielding plate may be operated by the servomotor to shield light from the opening portion in either the vertical or lateral direction or in both the directions.

As has already been described, when the focal position of the microlens is close to the light source side, the effective aperture ratio in transmitting light through the liquid crystal panel is improved, and in consideration of this fact, it is effective to set the thickness of the glass substrate of the counter substrate small. By setting the thickness of the counter substrate is small, the focal length of the microlens can be set large without decreasing the effective aperture ratio in the liquid crystal panel, thereby increasing the effective aperture ratio of the projection-type display apparatus. In addition, since the focal length of the microlens can be set large, the effective aperture ratio of the projection-type display apparatus does not largely depend on variations in f-number of the projection lens.

As shown in FIG. 21, a single-panel projection-type display apparatus has a relatively simple optical system. For this reason, the back focus length of the projection lens can be decreased, thereby decreasing the f-number of the projection lens to about 2.2 to 4. Therefore, it is important to optimize the numerical aperture NA (NA=n·sin δ) and focal length of the microlens in accordance with the f-number or numerical aperture NA of the projection lens. More specifically, the numerical aperture NA of the microlens is preferably designed to be smaller than that of the projection lens from a viewpoint of suppressing eclipse by the projection lens.

A void correction element for correcting the beam direction to minimize the illuminance irregularity of light incident on the liquid crystal panel surface will be described below. As has already been described above, when the light source is arranged perpendicularly to the elliptical condenser mirror, the illuminance irregularity is generated. In the above embodiment, a conical lens having a vertical angle of 120° is used to correct the decrease in intensity at the central position of light beam. At this time, the beam diameter $Q_2$ at the second focal position increases by about 2.5 times $Q_1$ obtained without conical lens because of the function of correcting the beam direction. For the illuminance irregularity of the light source with a degraded central illuminance, the void is corrected by refracting light on the two inclined surfaces of conical lens and correcting the beam direction from the inclined surfaces toward the central portion.

To correct the beam direction, the optical characteristics of the conical lens can also be replaced with a grating lens. More specifically, a grating lens having concentric or spiral grooves with inclined surfaces at a predetermined angle (vertical angle: 60°), as shown in the sectional view of FIGS. 24A and 24B, can be used.

FIG. 25A is a view showing a concept of void correction performed using a grating lens having concentric grooves at a vertical angle θ of 60° and a pitch of 200 μm. In a display element using such a grating lens 103, most of light emerging from the upper half of a left circle 302 on the incident side reaches the lower half of a right circle 304 and reaches a little the upper half of the circle. In this manner, even when the source light 302 having void is used on the left incident side, the light intensity at the central portion is strengthened on the right exit side.

Luminous fluxes with two directivities are simultaneously present at the central portion of the liquid crystal panel. To improve the uniformity of illuminance distribution or microlens effect, the vertical angle must be set to decrease this simultaneous presence, or grating lenses 203 and 204 as shown in FIG. 25B are used as needed.

FIGS. 26A to 26D are graphs showing illuminance distributions on the liquid crystal panel surface, which are obtained while changing the position of a single grating lens. A value z is a distance from the second focal position, and the positive direction represents the moving distance to the liquid crystal panel side. When the position of the void correction element is changed, the illuminance distribution can be controlled. In use such as a data projector which need minimize the illuminance irregularity, the correction element can be arranged near the second focal position of the spheroidal reflecting mirror (z=−5 to 0 mm). In use for projecting a video image, the correction element can be moved to a portion with z=10 mm (to the liquid crystal panel side) while strengthening the intensity at the center. This is also enabled with a convex conical lens or the like although the optimal position slightly changes.

The arrangement of an optical system for further increasing the efficiency of the above optical system will be described below. In the above optical system, most light is condensed to the second focal position by the elliptical condenser mirror. However, a component which is not reflected and converged by the elliptical mirror reaches the liquid crystal panel side. To effectively utilize this light component, a circular condenser mirror 7 having an opening portion is preferably arranged to oppose the elliptical condenser mirror, as shown in FIG. 7. The improvement effect for the total beam was measured using a circular mirror having a radius of 60 mm and an opening diameter of 44 mm.

As a result, it was confirmed that improvement could be achieved about 1.2 times independently of the presence/absence of microlenses. At this time, a light source which was not frost-processed was used, and a temperature keeping film in the side of liquid crystal panel which was normally used to efficiently return light reflected by the circular mirror 7 to the light-emitting portion of the light source was removed. As in the above embodiment, a DC lighting metal halide lamp in which an anode was arranged on the liquid crystal panel side was used. The lamp of this type has a good illuminance distribution.

In this composite condenser mirror structure, since the main condenser mirror is constituted by an elliptical mirror, light is condensed to the second focal position. In addition, since the opening portion of the second circular mirror can be made small, the efficiency improvement effect can be easily enhanced. This arrangement can also be effectively used to utilize the light-emitting component not opposing the elliptical condenser mirror, as in an arrangement in which the light source is arranged not vertically but horizontally with respect to the elliptical condenser mirror to decrease the illuminance irregularity generated by an act of the electrode portion as a shade, as a matter of course.

An example wherein the polarization/conversion technique serving as an efficiency improvement means in use of an optical modulation element which needs a polarizing plate such as a TN liquid crystal is applied to the above optical system will be described below. The conventional correction conversion element optical system has an arrangement for splitting a luminous flux by using microlenses, so it can hardly be applied to improve the effective aperture ratio. FIG. 8 shows an optical system as a modification of this embodiment, in which a polarization/conversion element, a λ/4 plate, a reflecting mirror, a concave biprism, and a conical lens are arranged between an elliptical condenser mirror and its second focal position.

Source light is incident on the polarization/conversion element and divided into a P-polarized component and an S-polarized component. The S-polarized component is transmitted through the λ/4 plate, converted to a P-polarized component, and reflected by the reflecting mirror while the P-polarized component is reflected by the reflecting mirror. The two components are synthesized again at the second focal position. The light is irradiated on the liquid crystal panel through the collimator lens.

FIG. 8 shows a single liquid crystal panel for the descriptive convenience. With this arrangement, light emitted from a point source formed by a luminous flux converged to the second focal position is introduced to the liquid crystal panel with microlenses. Therefore, a uniform improvement effect for the effective aperture. ratio by the microlens can be achieved on the panel surface. From a viewpoint of increasing the contrast ratio, a polarizing plate may be placed in front of the liquid crystal panel, as a matter of course.

An embodiment of a projection-type display apparatus which uses no liquid crystal panel with a color filter and achieves color display using a single panel will be described below with reference to FIG. 9.

The arrangement of the optical system will be described from the light source side. A DC lighting 250-W metal halide lamp 4 which is not frost-processed is arranged, and a white luminous flux from this light source is converged to a stop through an elliptical condenser mirror 5, a circular condenser mirror 7, and a conical lens 10 (the elliptical condenser mirror, the circular condenser mirror, and the conical lens are the same as those in the above embodiment). The luminous flux passing through the stop is collimated by a collimator lens group 13. The luminous flux is incident on a spectral component direction separating means constituted by three dichroic mirrors.

An R luminous flux is reflected by the first mirror and incident on the liquid crystal panel having a spectral component imaging means constituted by microlenses. Similarly, a G luminous flux and a B luminous flux are incident on the spectral component imaging means via the second and third mirrors, respectively. When a TN liquid crystal is used, polarizing plates are arranged in front and rear of the liquid crystal panel.

The R and B luminous fluxes are incident with an angle difference of about 4.8° with respect to the G luminous flux. Because of this angle difference, the three color luminous fluxes are incident on the pixels of the display panel in correspondence with three pixels through the microlenses, as shown in FIG. 23. The luminous flux emerging from the display panel is converged by the field lens and incident on the projection lens, and enlarged and projected onto the screen through the projection lens.

An optical arrangement of the projection-type display apparatus according to this embodiment shown in FIGS. 9 and 10 will be described below in detail.

The liquid crystal panel was formed by the same method as that in the above embodiment. As for the number of pixels, 1,920 pixels are formed in the horizontal direction at a pitch of 60 μm, and 480 pixels are formed in the vertical direction at a pitch of 180 μm. The diagonal size of the display portion is 144 mm. The number of pixels in the horizontal direction is three times that of a VGA display (640 pixels). Although no color filter is mounted, pixels corresponding to R, G, and B are arranged. The pixels are arranged in a stripe, and three pixels in the horizontal direction constitute a pixel group.

The spectral component imaging means used in this embodiment is microlenses. As shown in FIG. 12B, cylindrical lenses are formed on a glass substrate, and a light-shielding film having a width of 20 μm is formed to shield light between the lenses. Since pixel groups are continuously arranged at the same horizontal position in the vertical direction, the pixel groups apparently form a stripe at a pitch of 180 μm. This pitch corresponds to three horizontal pixels and satisfies the above relation.

The focal length is set to 1.4 mm with respect to a glass material having a refractive index of 1.54. In consideration of a counter substrate having a refractive index of 1.54 and a thickness of 1.1 mm, which is arranged between the microlenses and the pixels, and an acrylic adhesive having a refractive index of 1.5 and a thickness of 0.03 mm, which bonds the microlenses to the counter substrate, this setting is made to form a focal point on the exit side with respect to the pixel portion.

The opening portion of a pixel has an almost rectangular shape having a size of 31.5 μm in the horizontal direction and 135 μm in the vertical direction.

In this embodiment, a luminous flux incident on the liquid crystal panel is not influenced by the spectral component imaging means in the vertical direction. For this reason, the luminous flux emitted from the light source is incident on the liquid crystal panel at an almost equal angle distribution of 10°. To the contrary, in the horizontal direction representing the refracting power, the luminous flux is converged and diverged after emerging from the panel, resulting in an increase in incident angle to the projection lens. To estimate this angle, equations (26), (27), and (30) are applied to calculate an angle distribution $\theta_{px}$ of the incident luminous flux to a single pixel.

An angle distribution $\theta_{ew}=\theta_{wa}$ of an effective luminous flux to the liquid crystal panel is 2.5° from equation (26) and an opening width $W_a$=31.5 μm. Since the focal length of the microlens having a refractive index of 1.54 with respect to a medium is 1.4 mm, $f_{air}$=0.91 mm in accordance with equation (28). Since the effective width P of the microlens is 160 μm, an angle distribution $\theta_c$ generated by the microlens is 10° in accordance with equation (27). Therefore, the effective incident angle $\theta_{px}$ to the pixels in the horizontal direction is 12.5°. An incident angle difference $\theta_c$ generated by the spectral component direction separating means is 9.6° in accordance with equation (31).

In this embodiment, therefore, a bright projection lens having an f-number of 2.5 is used because an f-number for satisfying equation (35) must be 2.6 or less to effectively enlarge and project these luminous fluxes.

Setting of the stop means of the light source portion will be described below. A luminous flux from the light source is condensed to the position of the stop via the elliptical mirror, the circular mirror, and the conical lens. The shape of the luminous flux emerging from the stop is limited by the stop. The limitation of the shape is converted to the limitation of the angle distribution by the collimator lens. The arc direction (interelectrode direction) of the light source is perpendicular to the sheet surface of FIG. 9. As shown in FIG. 26, the stop has a rectangular shape elongated along the arc direction. A luminous flux emerging from the stop has an angle of about 4° with respect to a direction parallel to the sheet surface of FIG. 9 and about 10° with respect to a direction perpendicular to the sheet surface because the focal length of the collimator lens is 170 mm. The collimator lens is designed to form an achromatic lens together with the conical lens.

The white luminous flux emerging from the collimator lens is reflected by the dichroic mirrors arranged at an angle of about 45° with respect to an optical axis. These dichroic mirrors constitute the spectral component direction separating means. One of the dichroic mirrors is arranged at an angle of (45−4.8/2)=42.6° with respect to the incident luminous flux while the other dichroic mirror is arranged at an angle of (45+4.8/2)=47.4° with respect to the incident luminous flux such that a separation angle of 4.8° which is required in accordance with a relationship between. the display panel and the spectral component imaging means is satisfied. As for the position of each mirror, one mirror is arranged with its central point separated by 7.9 mm on the light source side while the other mirror is arranged with its central point separated by 7.3 mm toward the opposite side of the light source along the direction of the incident luminous flux in accordance with equations (18) and (19) such that the mirrors overlap at the position of the display panel arranged at a position separated from the central point of the dichroic mirror by 90 mm.

Only the B component of the incident luminous flux is reflected by the dichroic mirror. Of the luminous flux transmitted through the dichroic mirror, the G component is reflected by the dichroic mirror, and the remaining R component is reflected by the mirror. The mirror for reflecting the R component may be either a dichroic mirror or a total reflecting mirror. In this manner, the white luminous flux is spectrally divided into luminous fluxes having necessary angles.

According to this embodiment, a very bright projection-type display apparatus having a projection luminous flux up to 400 lm at maximum can be achieved. In an apparatus using an absorption type color filter, which uses a display panel having the same size and the same light source as in this embodiment, the projection luminous flux is about 230 lm. Therefore, according to the present invention, a brightness can be increased about 1.7 times.

In the apparatus using a color filter, the temperature at the central portion of the screen tends to increase as compared to the peripheral portion because of light absorption of the color filter, easily causing the display irregularity. In this embodiment, since the display panel portion has few elements for absorbing light, sufficient cooling-down can be performed by a simple cooling mechanism such as an electrically driven fan, and the display irregularity can also be prevented.

As described above, according to the arrangement of the present invention, a bright and high-performance projection-type display apparatus free from the display irregularity can be realized.

In the above embodiment, a TN liquid crystal is used as a liquid crystal layer. As the liquid crystal layer, any other liquid crystal can be used, and a digital mirror device (DMD) element can also be used. In this case, the difference in exit angle between the respective color beams generated by the spectral component direction separating means poses a problem.

Figure 22A:
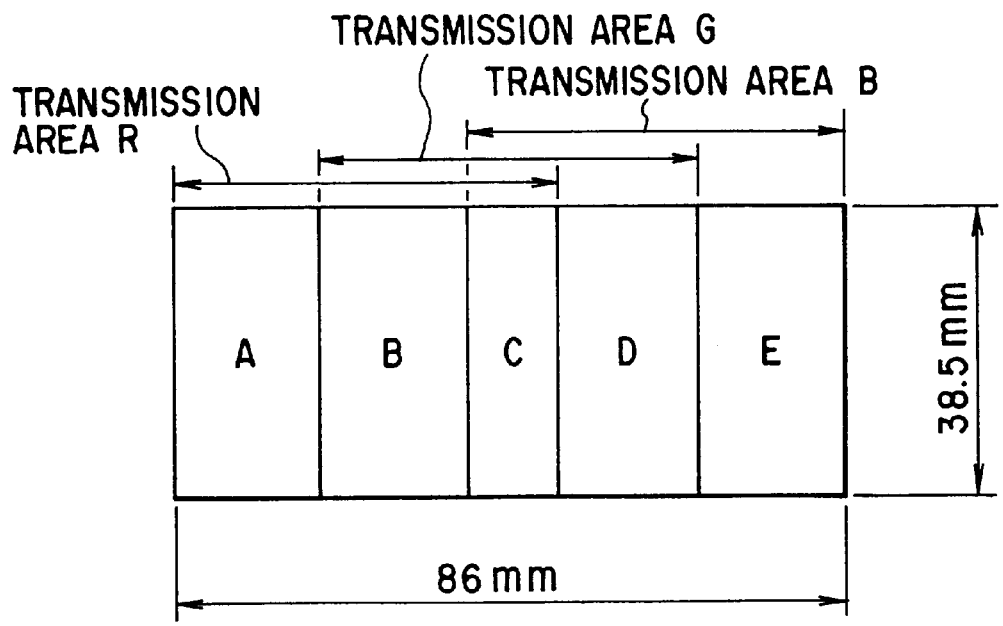
FIGS. 22A and 22B are views for explaining the spectral characteristics of a color filter inserted in a projection lens incident portion.
Figure 22B:
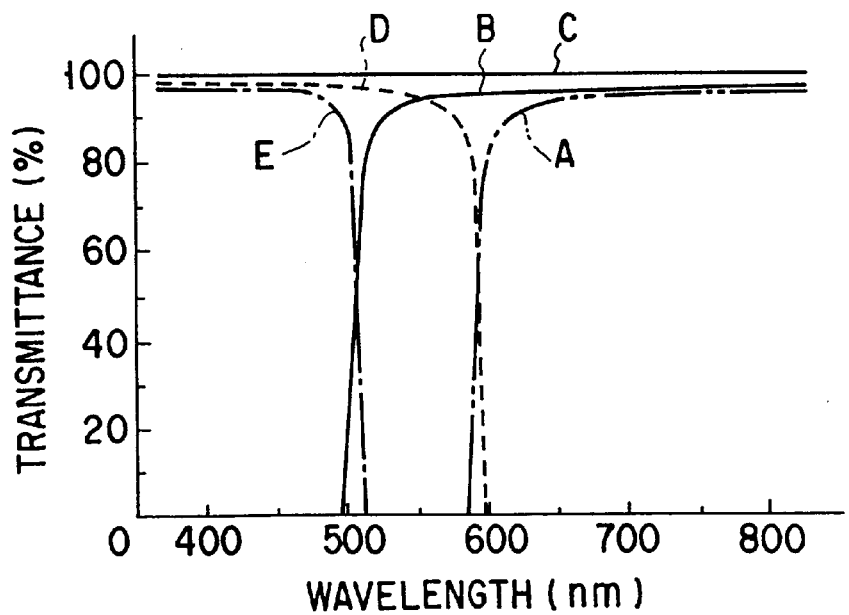

The projection optical system has a stop. However, in these elements, the exit angle changes depending on the color, and a plurality of stops are necessary in units of colors. More specifically, since the exit light from the liquid crystal panel has an angle distribution for each color, the light is divided into R, G, and B luminous fluxes at the position of the stop in the projection lens portion via the field lens. Therefore, stops having opening portions corresponding to the respective colors are necessary. At this time, when three aperture stops are simply formed, two opening stop portions other than that corresponding to each color luminous flux also effectively work, and no desired characteristics can be obtained. For this reason, by providing color filters A, B, and C corresponding to the respective color luminous fluxes to the stop of the projection optical system, the stop can be independently used for each color (FIGS. 22A and 22B).

The size of the stop must correspond to the angle distribution $\theta_{px}$ of the exit luminous flux from each color pixel. At this time, the size of the stop becomes large with respect to the pitch between the plurality of stops, which is determined by the separation angle $\theta_s$ by the spectral component direction separating means. For this reason, even when light emerging from the liquid crystal panel passes through the field lens and reaches the stop of the projection lens portion, the R, G, and B luminous fluxes often overlap each other. In this case, a color filter is provided to areas A to E where the respective color luminous fluxes overlap each other, or independent areas. With this arrangement, the same converging angle can be set for each color, and uniform and excellent characteristics can be obtained.

A modification of the above embodiment will be described below with reference to FIG. 9.

The optical arrangement is almost the same as in the above embodiment except for the following points. After source light is collimated by a collimator lens, infrared rays are removed by the cold mirror, and the path is deflected by 90°. In the liquid crystal panel, the pixel pitch is 180 μm in the horizontal direction and 156 μm in the vertical direction. As for the number of pixels, 508 pixels are arranged in the horizontal direction, and 440 pixels are arranged in the vertical direction. The pixels are arranged in a triangle. The thickness of a counter substrate is 1.1 mm.

Figure 27:
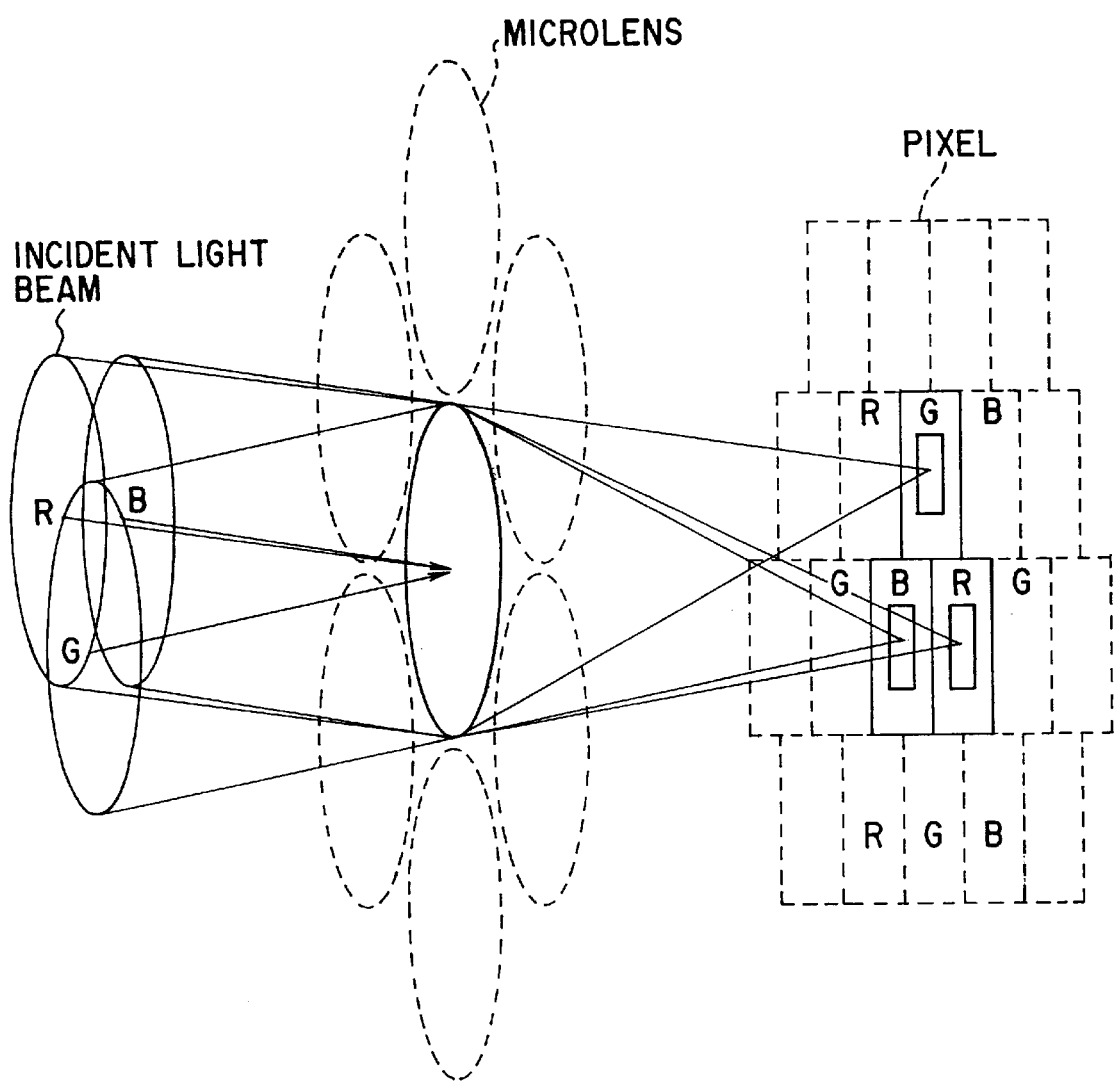
FIG. 27 is a view for explaining the direction of light incident on a liquid crystal panel in the second modification of the present invention.

FIG. 27 is a view showing a state wherein R, G, and B primaries are exchangeably separated in this embodiment. Each of R, G, and B, incident luminous fluxes toward three directions at an angle of about 8° from the vertical direction with respect to the liquid crystal panel forms a position distribution on the pixel through the microlens, and the R, G, and B luminous fluxes pass through appropriate pixels.

In this projection-type display apparatus, to efficiently project divergent light generated by the spectral component direction separating means and the spectral component imaging means, a bright lens having an f-number of 2.5 is used.

As the spectral component direction separating means, a mirror inclined at about 45° is used. However, another angle can also be applied, as a matter of course.

As the liquid crystal panel of the above embodiment, an active matrix liquid crystal panel having a switching element consisting of a TFT for each display pixel has been exemplified. The TFT may also be mainly constituted by a polysilicon film or a monocrystalline silicon film. As the switching element, an MIM (Metal Insulator Metal) element may also be used in addition to the TFT. As the liquid crystal panel, in addition to the active matrix liquid crystal panel, a simple matrix liquid crystal panel in which stripe electrodes substantially cross each other while holding a liquid crystal composition may also be used.

The present invention is not limited to the contents of the above embodiments. As the display panel, a modulation element array for two-dimensionally modulating the light intensity from the light source can also be used in addition to the TN liquid crystal. An STN liquid crystal or a ferroelectric liquid crystal can also be similarly used. In addition to a liquid crystal, a digital mirror device (DMD) or the like can also be used.

As the display apparatus, a projection-type display apparatus which projects an image toward the front space has been described as each embodiment described above. However, the present invention can also be effectively applied to a rear projection-type display apparatus as a projection-type display apparatus which projects an image from one surface of the screen, and the image is observed from a direction opposite to the projection direction, as a matter of course.

In the above embodiments, a three-mirror assembly is used as a spectral component direction separating means. However, a prism block, a micro prism, a diffraction grating, or the like may be used. Furthermore, a hologram optical device having both functions of spectral component direction separating means and spectral component imaging means may be used.

According to the projection-type display apparatus of the present invention, a display image which has a high luminance and satisfactory display quality and is free from the luminance irregularity can be obtained.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A projection-type display apparatus comprising:

optical modulation means for controlling a light transmittance by birefringence or rotatory polarization of light;

a light source optical system for guiding source light from a light source to said optical modulation means; and a projection optical system for projecting the light modulated by said optical modulation means onto a screen, wherein said light source optical system includes said light source and source light control means for controlling a converging angle of the source light from said light source, and said source light control means includes means for condensing the source light from said light source, stop means arranged near a position where the source light is condensed, stop controlling means for controlling said stop means in accordance with an ambient illuminance, and a collimator lens.

2. An apparatus according to claim 1 further comprising:

illuminance detecting means for detecting the ambient illuminance, wherein said stop means is controlled by said stop controlling means in accordance with an output of said illuminance detecting means, thereby controlling the converging angle of the source light.

3. A projection-type display apparatus comprising:

optical modulation means for controlling a light transmittance by birefringence or rotatory polarization of light;

a light source optical system for guiding source light from a light source to said optical modulation means; and a projection optical system for projecting the light modulated by said optical modulation means onto a screen, wherein said light source optical system includes source light control means for controlling a converging angle of the source light from said light source, and said source light control means includes means for condensing the source light from said light source, stop means arranged near a position where the source light is condensed, and stop controlling means for controlling said stop means in accordance with an illuminance signal of a video signal.

4. An apparatus according to claim 3, wherein said optical modulation means comprises a display panel, said apparatus further comprises display panel driving means for supplying the video signal to said display panel, and said stop means is controlled by said stop controlling means in accordance with the illuminance signal of the video signal, thereby controlling the converging angle of the source light.

* * * * *